United States Patent
Harthcock

(12) 
(10) Patent No.: US 6,347,368 B1
(45) Date of Patent: Feb. 12, 2002

(54) MICROCOMPUTING DEVICE FOR EXCHANGING DATA WHILE EXECUTING AN APPLICATION

(76) Inventor: Jerry David Harthcock, P.O. Box 1305, Boerne, TX (US) 78006

(*) Notice: Subject to any disclaimer, the term of this patent is extended or adjusted under 35 U.S.C. 154(b) by 0 days.

(21) Appl. No.: 09/222,974

(22) Filed: Dec. 30, 1998

Related U.S. Application Data

(60) Provisional application No. 60/070,183, filed on Dec. 30, 1997.

(51) Int. Cl.$^7$ .............................................. G06F 11/00
(52) U.S. Cl. ......................... 712/227; 712/225; 714/45
(58) Field of Search ................................ 712/227, 225; 717/4; 714/30, 45; 710/107

(56) References Cited

U.S. PATENT DOCUMENTS

| | | | | |
|---|---|---|---|---|
| 5,329,471 A | | 7/1994 | Swoboda et al. ............. | 703/23 |
| 5,724,505 A | * | 3/1998 | Argade et al. ................ | 714/45 |
| 5,889,966 A | * | 3/1999 | Sonobe ........................ | 710/107 |
| 5,978,902 A | * | 11/1999 | Mann .......................... | 712/227 |
| 6,145,122 A | * | 11/2000 | Miller et al. .................. | 717/4 |
| 6,154,857 A | * | 11/2000 | Mann .......................... | 714/30 |

* cited by examiner

*Primary Examiner*—Zarni Maung
*Assistant Examiner*—Jungwon Chang

(57) ABSTRACT

An apparatus and methods for data exchange with microcomputing devices. In one embodiment, the invention consists of a microcomputing device having a plurality of instruction buses. The first bus is the primary instruction bus from which the device core receive application instructions. A secondary bus is the bus from which the device core receives data exchange instructions. Operative with the plural instruction buses is circuitry for receiving data exchange instructions on the secondary instruction bus and circuitry for selecting from which of the instruction buses the core fetches instructions on any given cycle. In addition to plural instruction buses, some instructions specific to data exchange have been added to the core's instruction set, allowing the device to perform data exchange instructions such as read and write with a single-word data exchange instruction. A method for summoning the core to perform a data exchange subroutine without the use of interrupts is provided. In accordance with the method, upon completion of the data exchange subroutine, the device resumes execution of foreground tasks. Appropriate flags, able to be sensed and cleared by external means, are provided to indicate that a data exchange subroutine is in service or completed. A method for implementing hardware and software breakpoints is provided. Data exchange instructions are described that gain control of the core to allow foreground processes to be single-stepped, while allowing background processes to continue. Again, flags are provided to indicate breakpoint status and may be sensed and cleared by external means. Finally, a JTAG scan engine capable of data exchange and an array of such JTAG scan engines in a debug and test system for microcomputing devices is presented.

7 Claims, 35 Drawing Sheets

BRK_SRVC:  EI  /-97  ;FOR REAL-TIME MODE, ENABLE

LOI  ;INTERRUPTS AND LOITER RIGHT HERE
  \-98

FIG. 13

BRK_SRVC:  LOI  /-99  ;FOR NON-REAL-TIME MODE, JUST

;LOITER RIGHT HERE

FIG. 14

MICROCOMPUTING DEVICE FOR EXCHANGING DATA WHILE EXECUTING AN APPLICATION

RELATED PATENT APPLICATIONS

This patent application claims priority to U.S. Provisional Application No. 60/070,183 filed Dec. 30, 1997 entitled MICROCOMPUTING DEVICE HAVING A ZERO SOFTWARE OVERHEAD REAL-TIME MONITORING ARCHITECTURE, said application in its entirety is hereby expressly incorporated by reference into the present application.

TECHNICAL FIELD

The present invention generally relates to microcomputing devices such as microprocessors, microcontrollers, digital signal processors (DSP), or reduced instruction set computers (RISC). More particularly, this invention relates to an apparatus and method for performing real-time data exchange with a microcomputing device for monitoring and debugging such devices and application programs intended for such devices.

BACKGROUND ART

Microcomputing devices of the past, because of their architecture and slower speed, were typically constrained to one or two concurrent tasks. A foreground task consumed the lion's share of the device's processing capacity, while background tasks were performed aperiodically by way of interrupts. Existing methods of debugging both foreground and background tasks on microcomputing devices include data exchange via stop-mode emulation using hardware and software breakpoints, and real-time data exchange via interrupts and a serial interface.

Using stop-mode emulation, when a breakpoint is encountered in either a foreground or background task, the device core (and hence processing on all types of tasks) comes to a halt. This method of emulation and debug can be fatal to some application hardware, especially when monitoring and debugging software applications for hardware such as hard disk drives, weapons guidance control systems, or any systems involving feedback control of electric motors or gas engines. For example, a breakpoint may occur while the hard disk drive spindle is spinning and the drive heads are extended and airborne. If the process (typically a background process) that controls spindle speed is halted, the spindle may slow down causing the heads to lose lift and crash into the platters.

While processing of foreground and background tasks is halted, the registers, memory, and input/output (I/O) of the microcomputing device may be examined and modified, and tasks may be advanced one instruction at a time, i.e., single-stepped. Particularly in the case of U.S. Pat. No. 5,329,471 ('471), the microcomputing device's core is halted and effectively replaced by separate state machine circuitry that retrieves and modifies registers memory, and I/O. As described in the '471 patent, all background tasks are typically disabled.

With real-time data exchange via interrupts and a serial interface, it is possible for the microcomputing device to respond to a software breakpoint while allowing background tasks to continue. However, existing implementations of this method require substantial data exchange interrupt service routines that occupy program memory space to implement data exchange functions. These service routines, if not stored in ROM, must be downloaded in to program memory before monitoring and debugging.

The most constraining drawback of existing methods of real-time data exchange is that simple functions such as reading or writing from memory require an unacceptable amount of processing cycles to complete. For example, a typical data exchange command comprises at least four bytes as follows. <command>, <address high>, <address low>, <data>. When communicated through an eight-bit serial port, the command requires at least four interrupts, one for each byte, to be completely received. Once received, even more processing cycles are required to evaluate and execute the command.

By modifying the architecture of the microcomputing device so that data exchange capabilities are inherent in the device itself, the disadvantages of existing data exchange methods may be overcome so that such commands may be handled without halting foreground or background processes, and with reduced processing overhead. The present invention accomplishes this while continuing to support the use of hardware and software breakpoints, and single-step operation.

SUMMARY OF THE INVENTION

The present invention consists of apparatus and methods for data exchange with microcomputing devices. In one embodiment, the invention consists of a microcomputing device having a plurality of instruction buses. The first bus is the primary instruction bus from which the device core receives application instructions. A secondary bus is the bus from which the device core receives data exchange instructions. Operative with the plural instruction buses is circuitry for receiving data exchange instructions on the secondary instruction bus and circuitry for selecting from which of the instruction buses the core fetches instructions on any given cycle. In addition to plural instruction buses, some instructions specific to data exchange have been added to the core's instruction set. These added instructions allow the device to perform data exchange instructions such as read and write with a single-word data exchange instruction.

The present invention is represented by an eight-bit microcontroller core capable of executing standard Motorola 68HC05 object level instructions in its normal mode, and data exchange instructions during data exchange. The primary instruction bus is 8 bits wide. The secondary instruction bus is 32 bits wide, allowing for the operation code (op code), address (both high and low bytes), and data to be included in one 32-bit instruction enabling a single data exchange instruction fetch cycle. In this implementation, the device core is responsive to 32-bit wide data exchange instructions presented on the secondary instruction bus and executes data exchange read and write operations in only 3 clock cycles. No interrupts, and therefore no lengthy context save and restore operations are required. Hence, the invention requires no separate data exchange code in order to read from or write to memory or I/O.

In the preferred embodiment, the circuit for presenting data exchange instructions to the secondary instruction bus is by way of a Joint Test Advisory Group (JTAG) Institute of Electrical and Electronics Engineers (IEEE) 1149.1 scan path. However, a number of other circuits, such as RS-232 or bond-out parallel I/O, may be used to present data exchange instructions. Once data exchange instruction is presented to the secondary instruction bus, a data exchange request signal is generated. On the next op code fetch cycle, the core will fetch a single 32-bit data exchange instruction from the secondary instruction bus. During the fetch and execution of the data exchange instruction, a signal is provided to indicate that the data exchange cycle is active. When the data exchange cycle is completed, another signal is provided to indicate completion. These signals may be sensed and cleared by external means.

According to another aspect of the present invention, a method for summoning the core to perform a data exchange subroutine without the use of interrupts is provided. In accordance with the method, upon completion of the data exchange subroutine, the device resumes execution of foreground tasks. Appropriate flags, able to be sensed and cleared by external means, are provided to indicate that a data exchange subroutine is in service or completed.

The present invention also includes a method for implementing hardware and software breakpoints. Data exchange instructions are provided that gain control of the core to allow foreground processes to be single-stepped, while allowing background processes to continue. Again, flags are provided to indicate breakpoint status and may be sensed and cleared by external means.

BRIEF DESCRIPTION OF THE DRAWINGS

FIG. 13 is example data exchange source code for real-time data exchange breakpoint operations.

FIG. 14 is example data exchange source code for non-real-time breakpoint operations.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternate forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

In a preferred embodiment, the present invention includes a microcomputing device (device) that exchanges data with an external device while the microcomputing device continues to run foreground tasks (in either run time or single step mode) and background tasks. The device performs such data exchange without disturbing its core's context, and without requiring monitor subroutines. In a preferred embodiment, the device is responsive to object code compatible with a Motorola 68HC05 and also to data exchange instructions. In the preferred embodiment, data exchange with an external device occurs through a boundary scan interface compliant with the Joint Test Advisory Group (JTAG) Institute of Electrical and Electronics Engineers (IEEE) 1149.1 standard.

Figure 1:
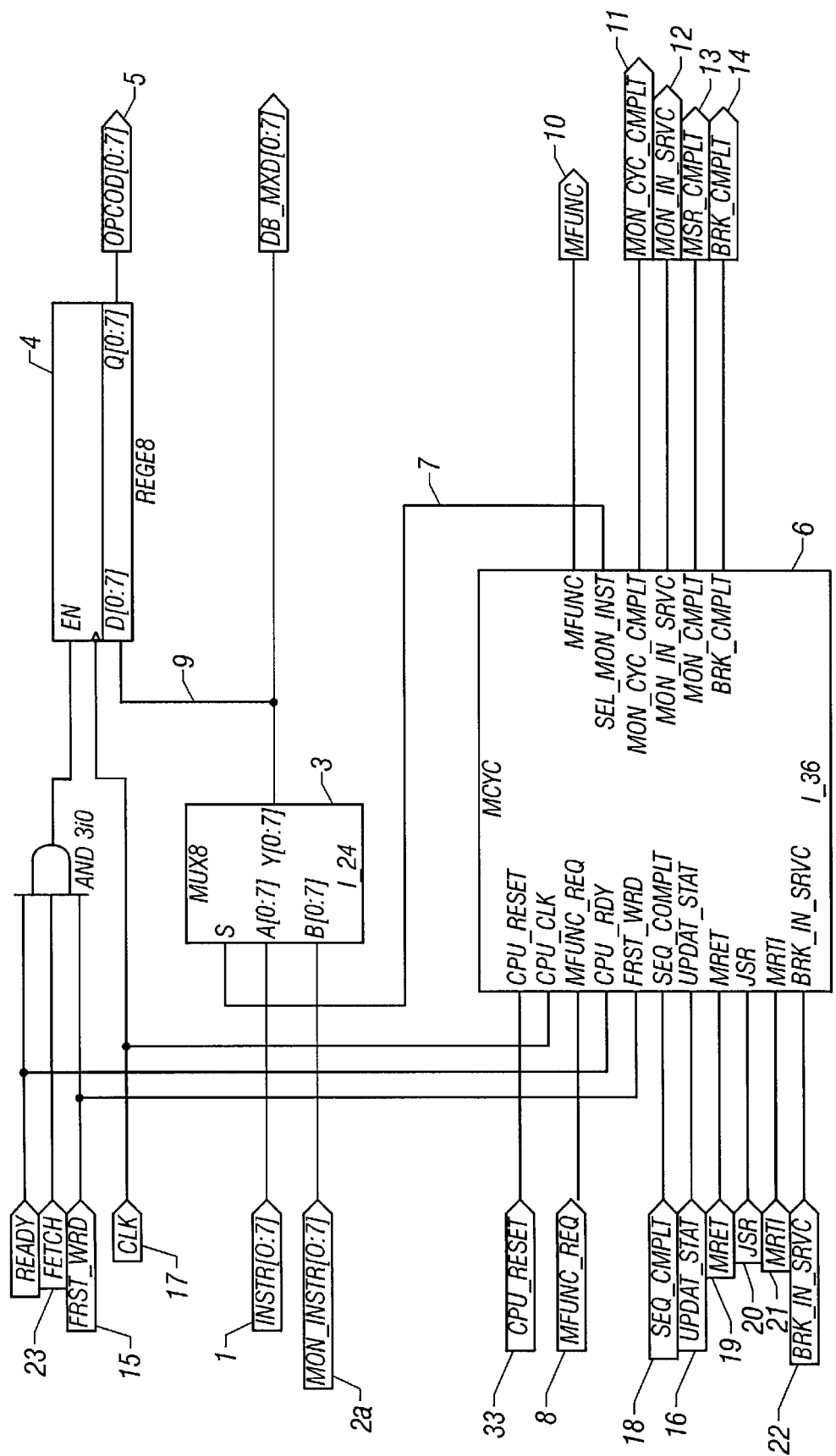
FIG. 1 is a schematic diagram showing the arrangement of the core's instruction register in relation to the primary and secondary instruction buses, instruction bus selection circuitry, and data exchange signals of the present invention.
Figure 2:
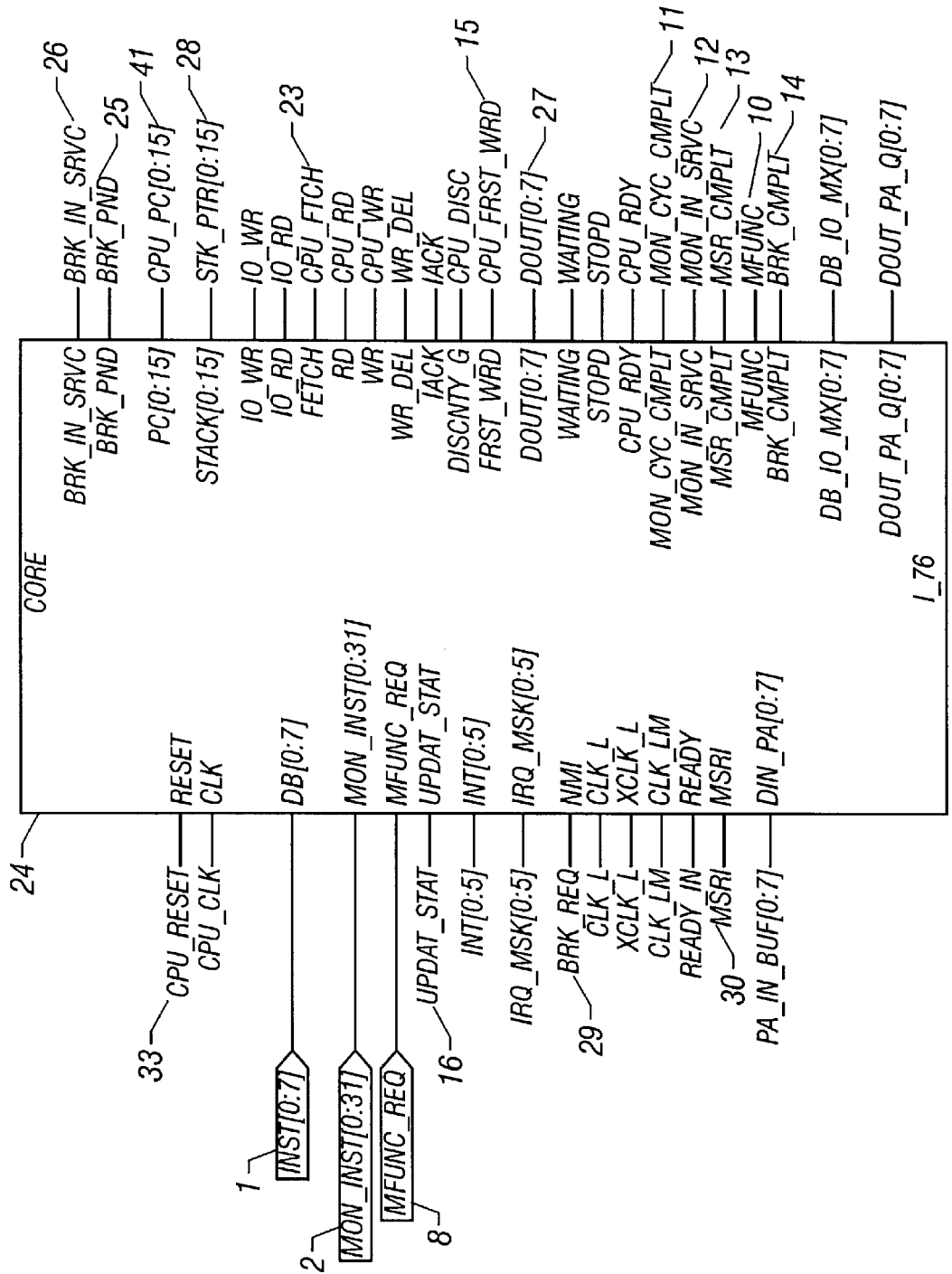
FIG. 2 is a block diagram of the I/O of the device core of the present invention.
Figure 3:
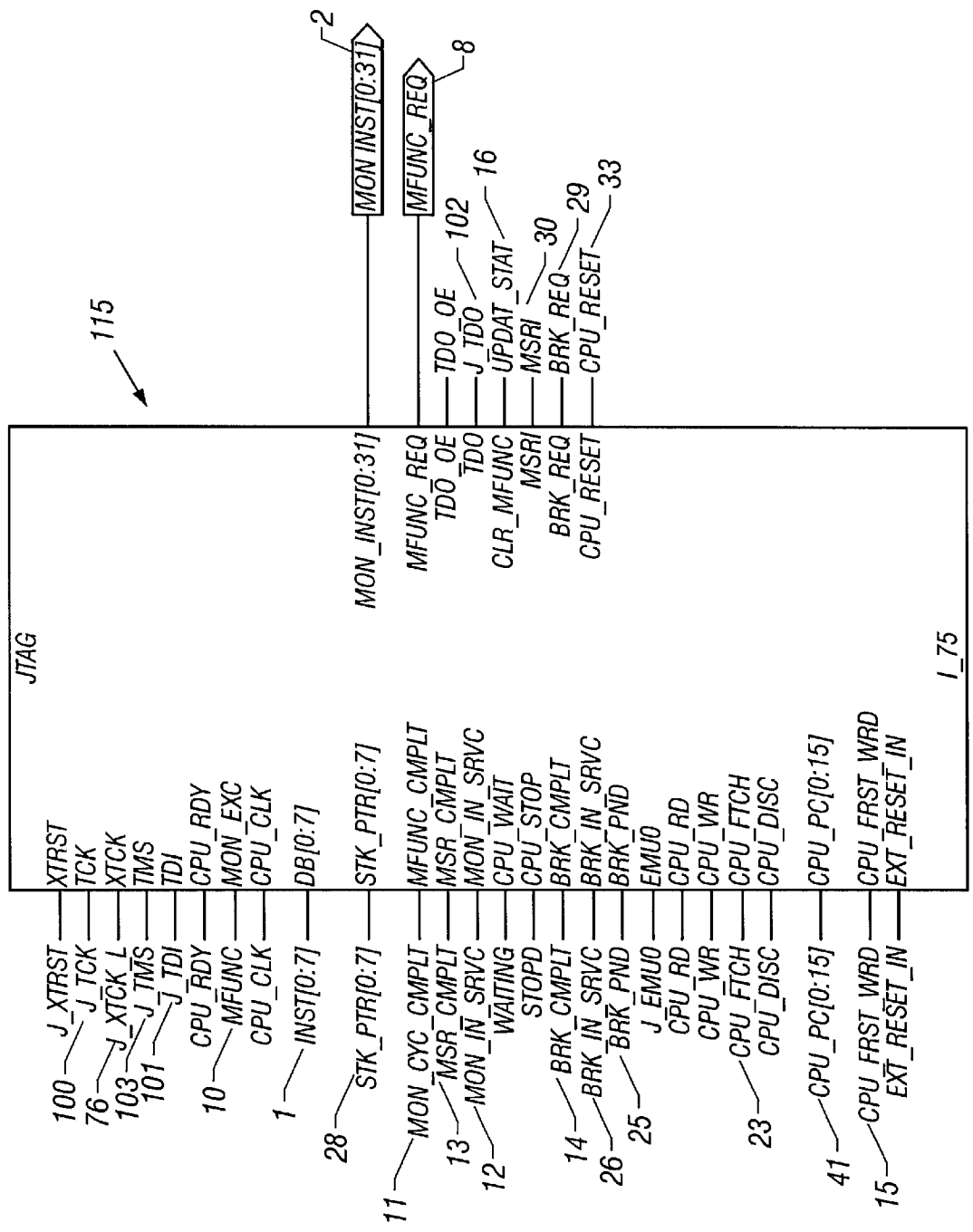
FIG. 3 is a block diagram of the I/O of the data exchange instruction presentation circuitry of the present invention.

Referring to FIG. 1, FIG. 2, and FIG. 3, the microcomputing device includes at least one primary instruction bus 1 from which it fetches application program instructions; and at least one secondary instruction bus 2 from which it fetches data exchange instructions.

The device's core instruction register 4, shown in FIG. 1, holds the operation code (op code) of the previous fetch cycle. The registered op code is decoded by the device's core decode logic and subsequently executed in a series of microsequencer states. The core instruction register 4 receives the op code from either the primary instruction bus 1 or the first eight bits of the secondary instruction bus 2, i.e., the data exchange op code 2a. An op code selection circuitry 3, responsive to an instruction bus selection signal 7 from the data exchange cycle block 6, determines from which instruction bus the register receives the op code. A functional schematic of the data exchange cycle block 6 may be found at FIG. 10.

FIG. 2 is a block diagram of the device core I/O showing the primary instruction bus 1; the secondary instruction bus 2; the data exchange function request signal 8; along with other signals associated with data exchange 10, 11, 12, 13, 14, and 26.

FIG. 3 is a block diagram of the JTAG IEEE 1149.1 data exchange presentation circuitry (JTAG interface) I/O. Data exchange signals 10, 11, 12, 13, 14, and 26 are sensed from the device core by way of the JTAG scan path of FIG. 3. The data exchange signals 10, 11, 12, 13, 14, and 26 not only provide indication to an external device, e.g., a host debug station, that exchange is active, but also indicate the data exchange cycle stage.

Figure 4:
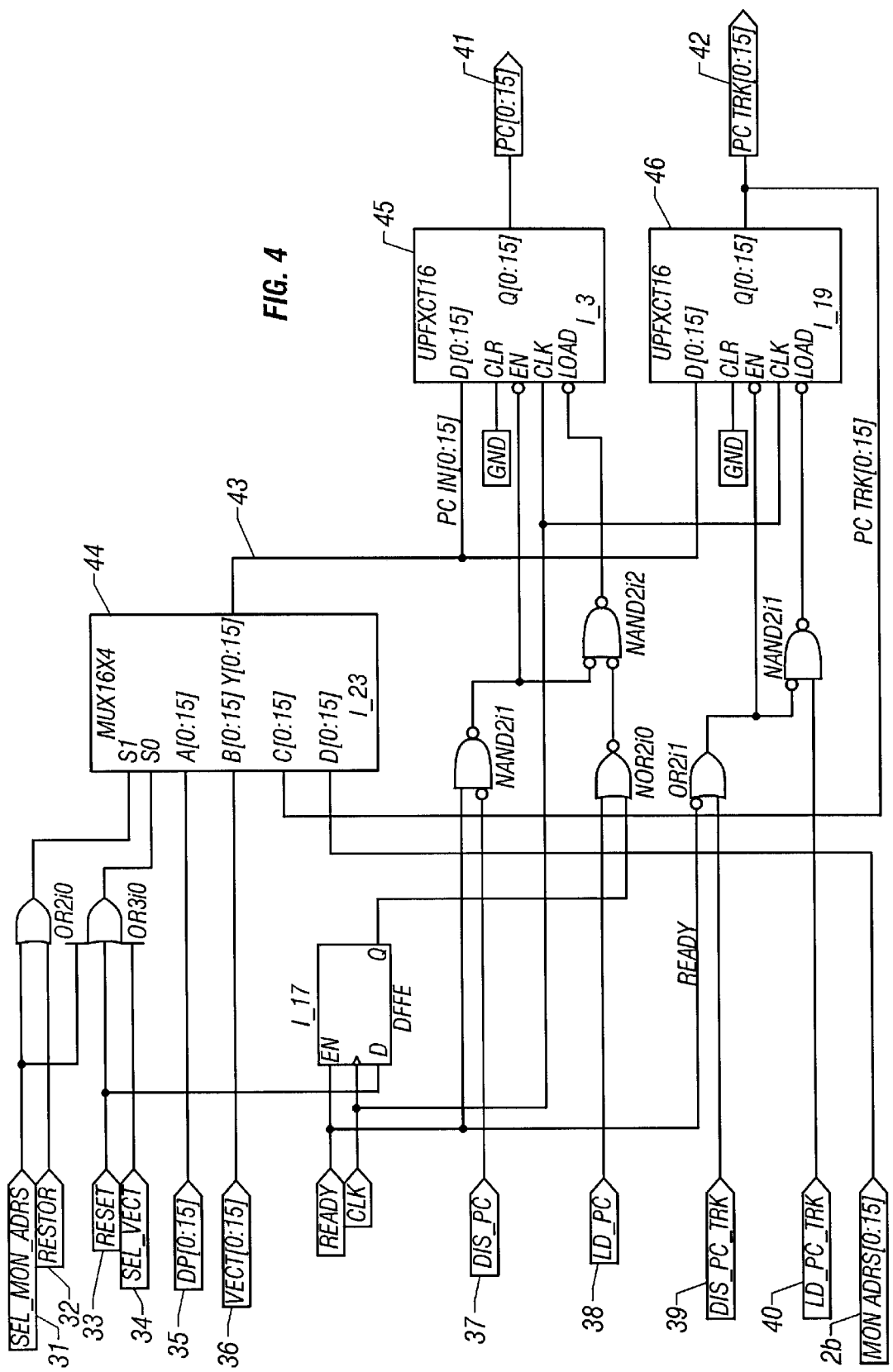
FIG. 4 is a schematic diagram of the circuitry for generating, preserving and restoring addresses used for both data exchange and non-data exchange operations.
Figure 7:
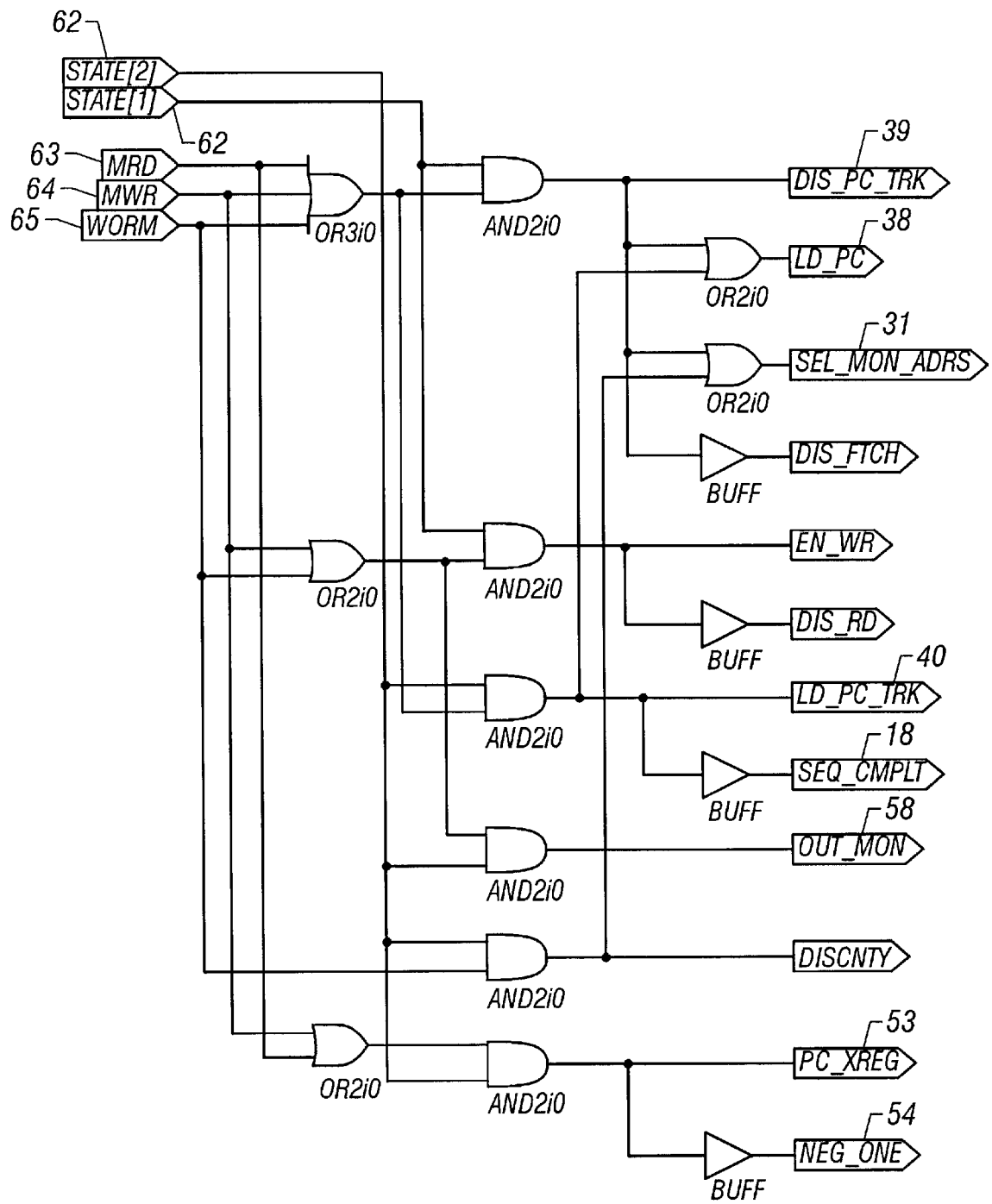
FIG. 7 is a schematic diagram for the microsequencer used for data exchange instructions.
Figure 8A:
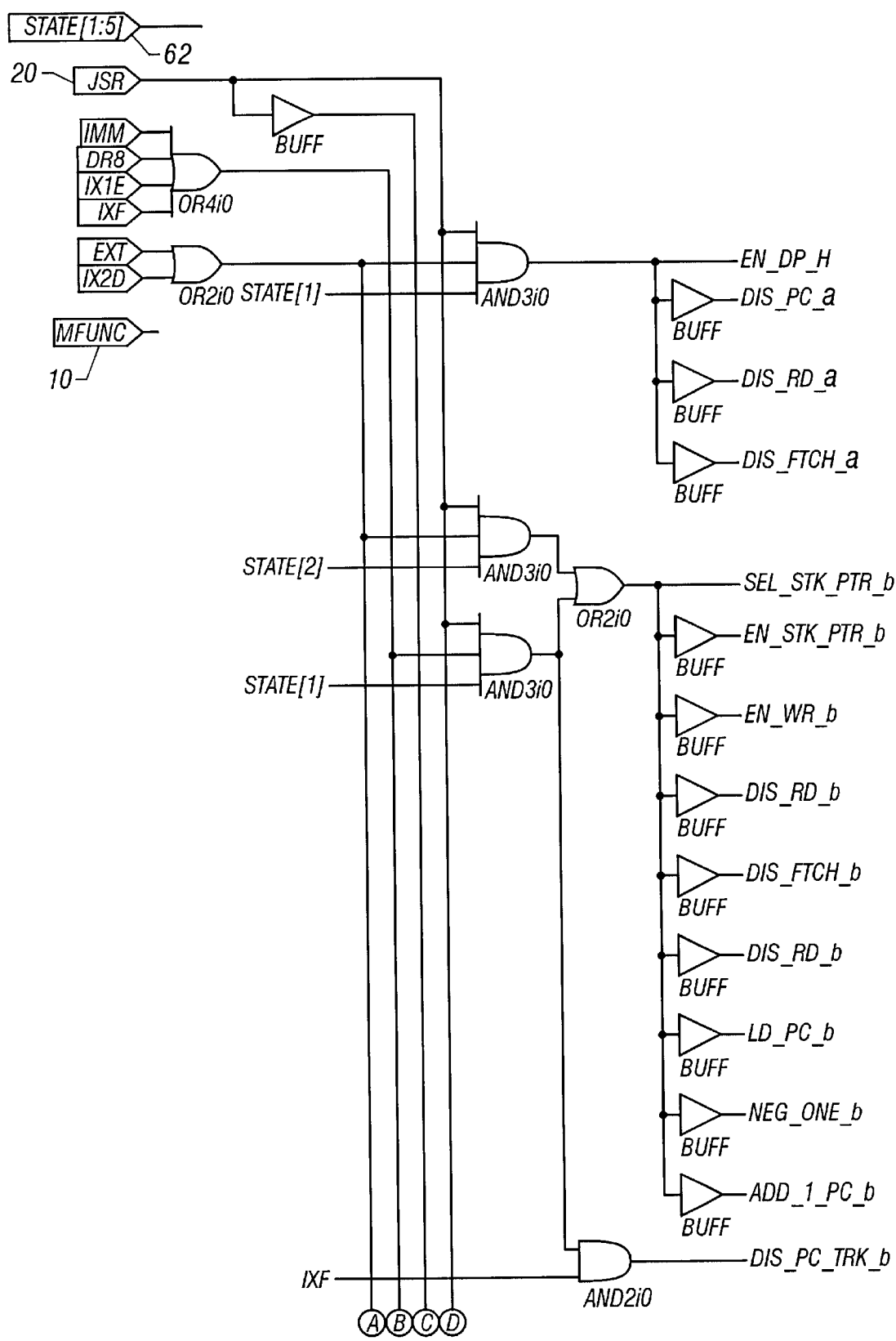
FIG. 8 is a schematic diagram of the microsequence logic of JSR and MSR instructions.
Figure 8B:
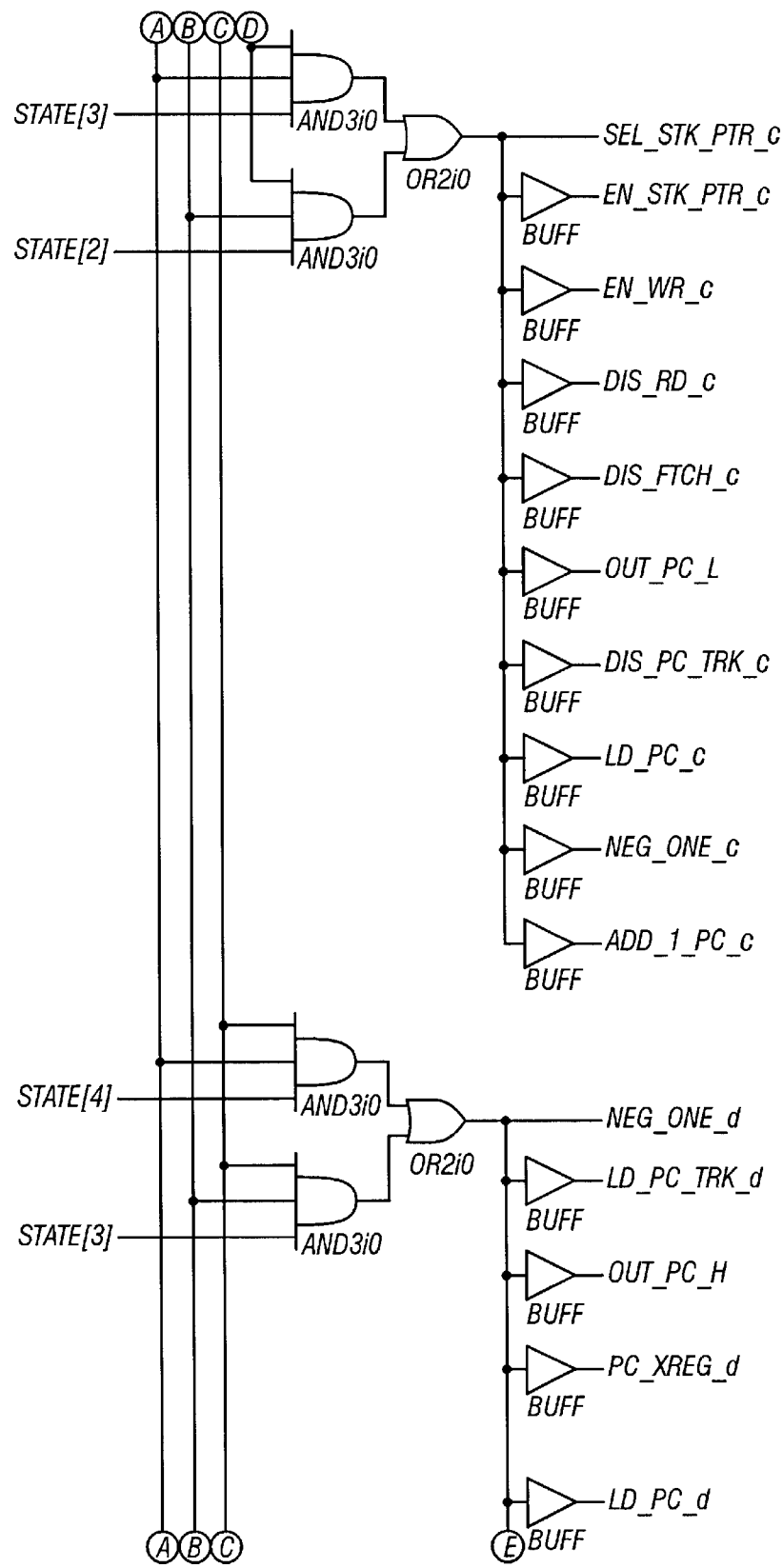
Figure 8C:
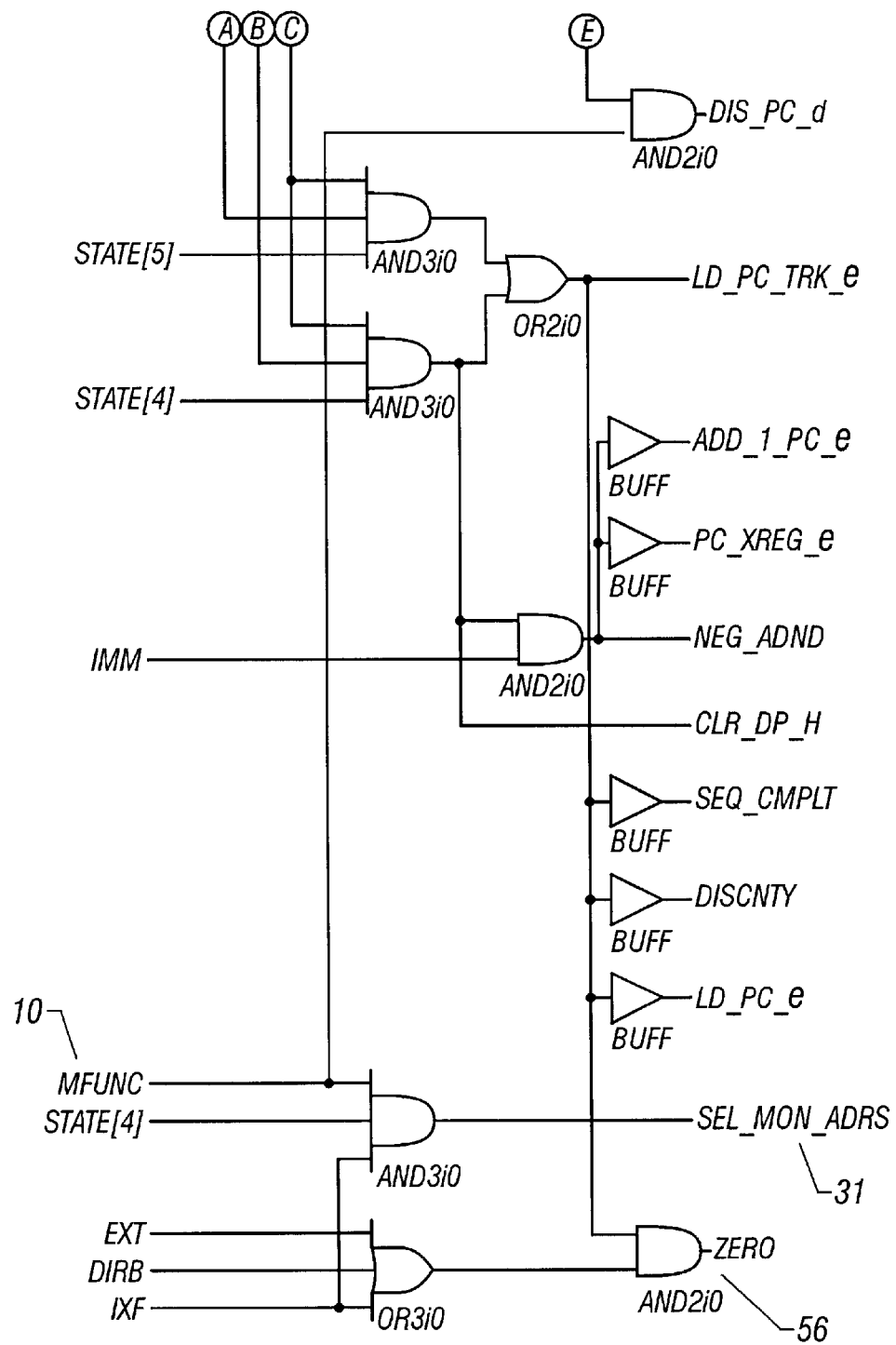
Figure 8D:
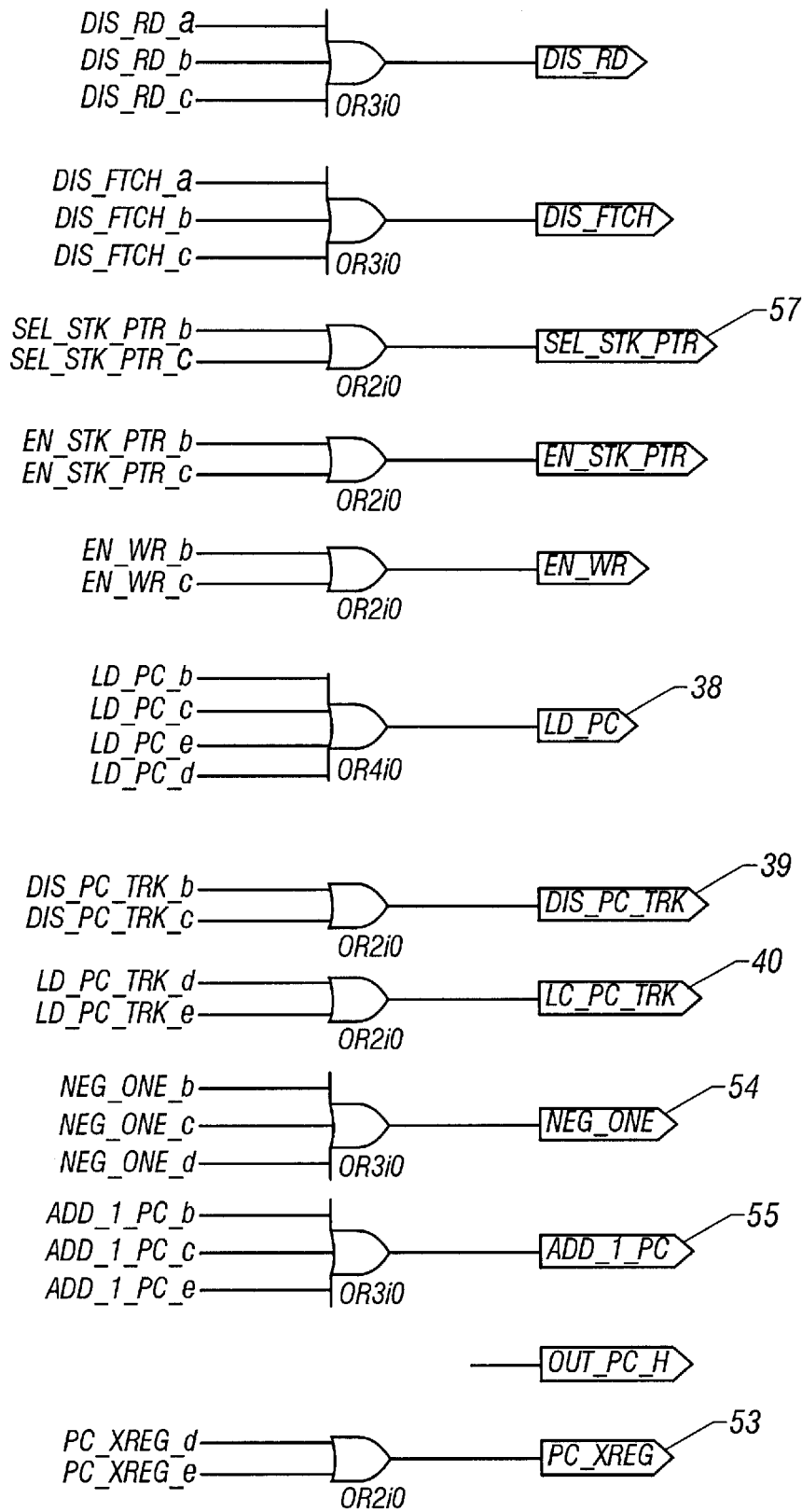
Figure 8E:
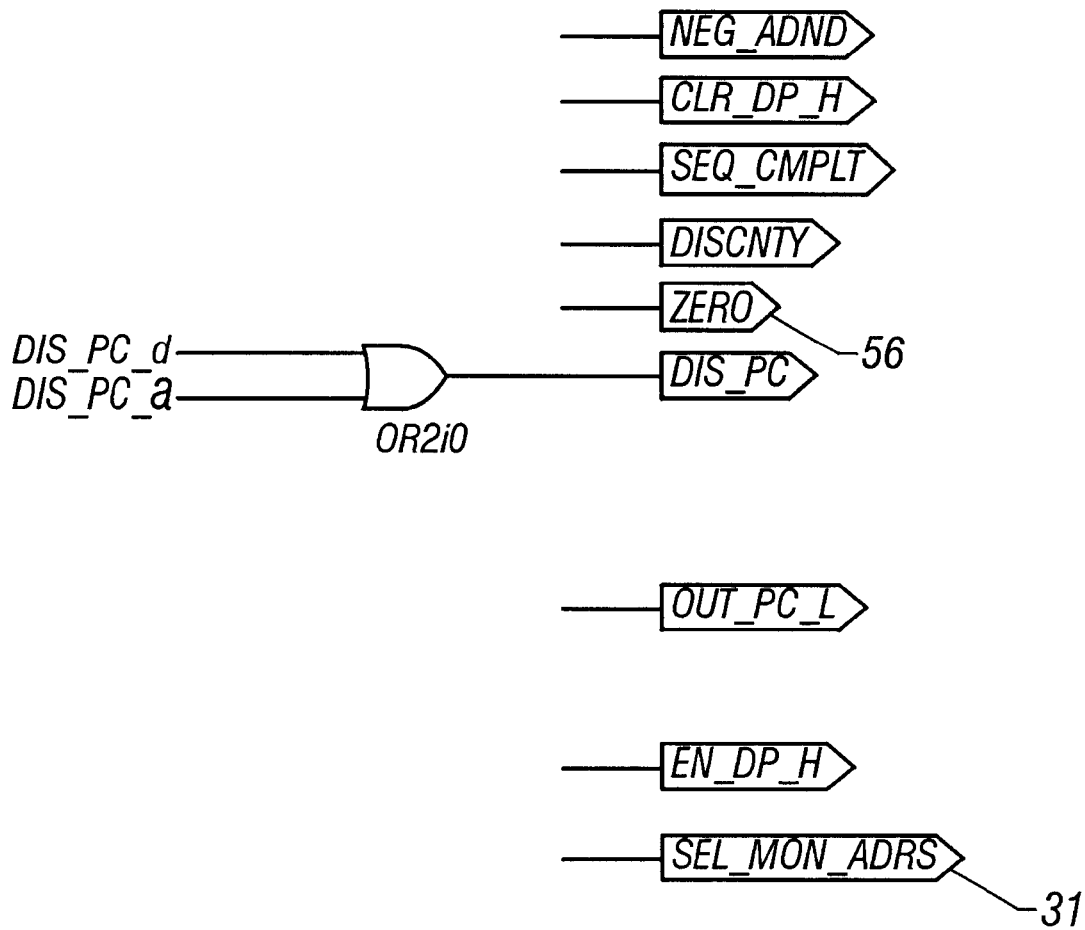
Figure 9A:
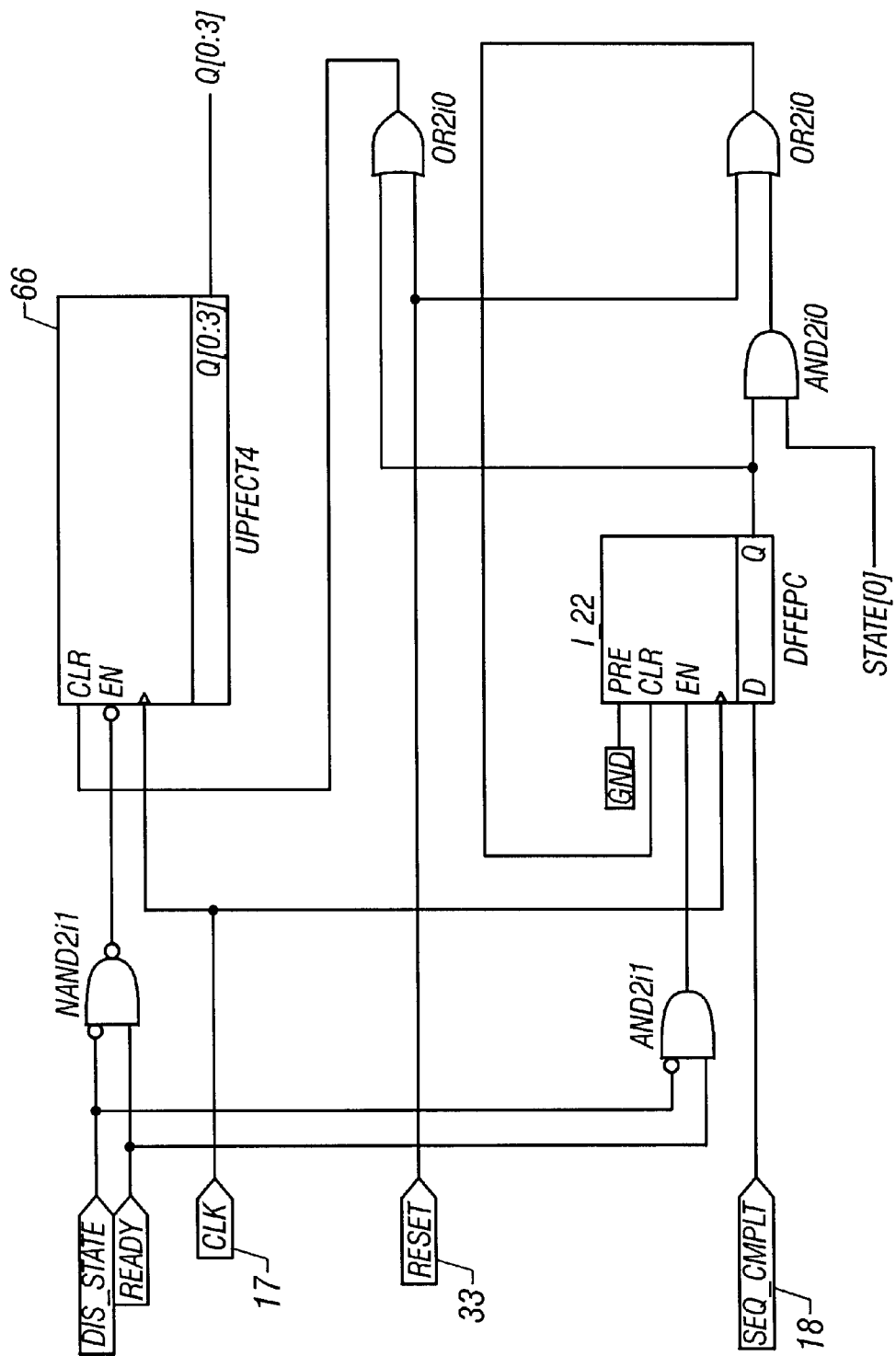
FIG. 9 is a schematic diagram of the microsequencer state generator and decoder.
Figure 9B:
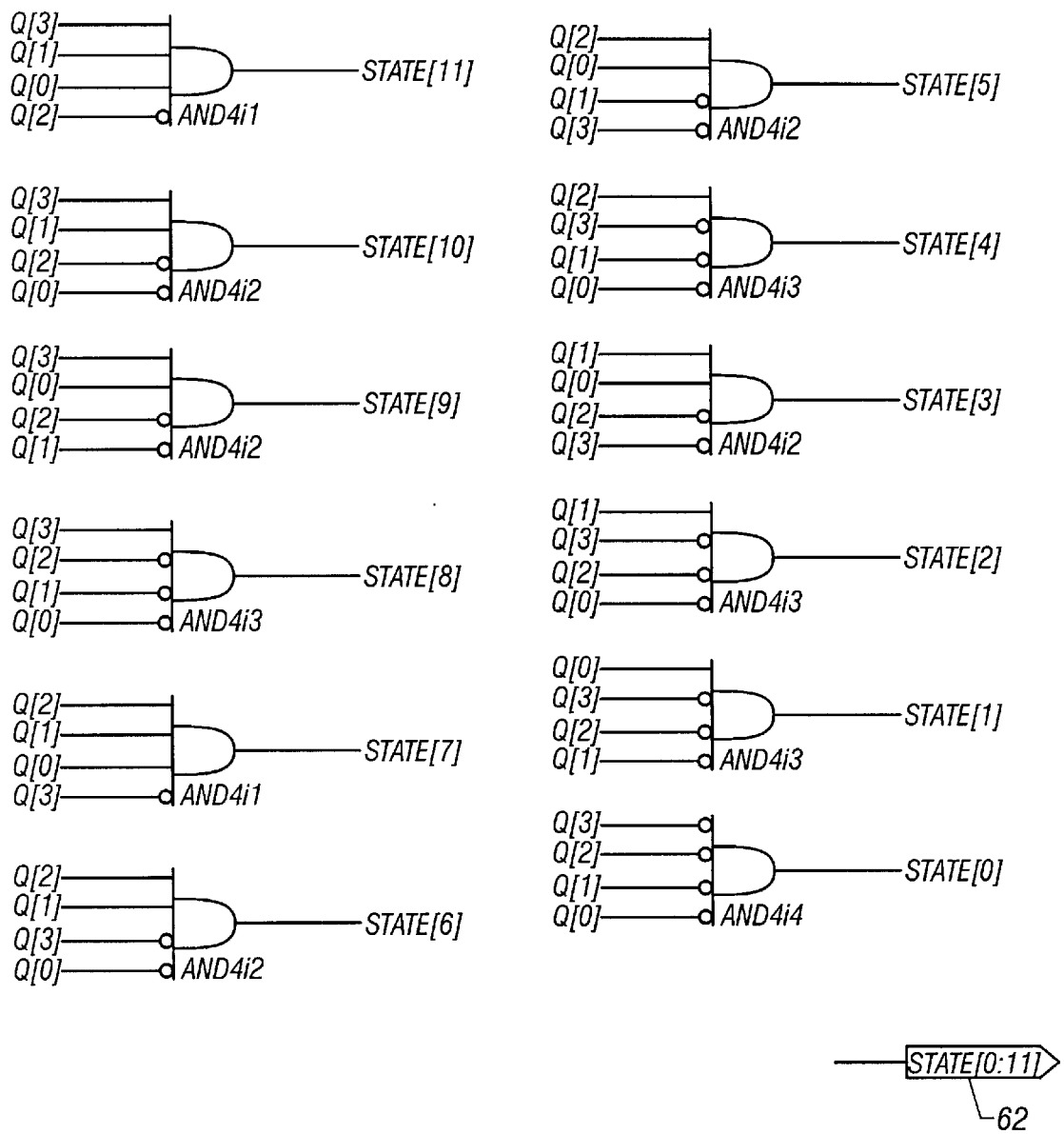
Figure 10A:
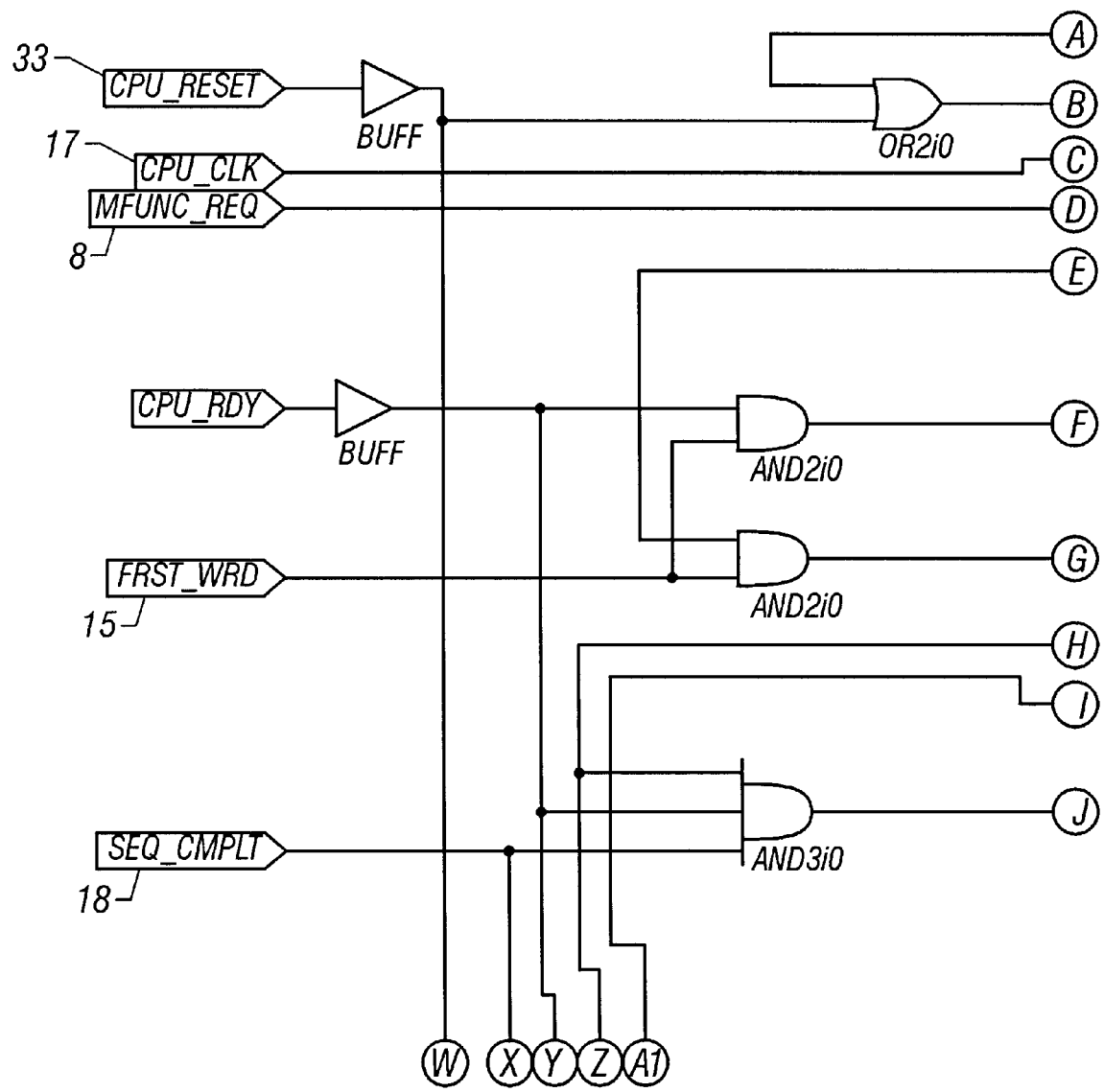
FIG. 10 is a schematic diagram of the data exchange cycle status generation and reset circuit.
Figure 10B:
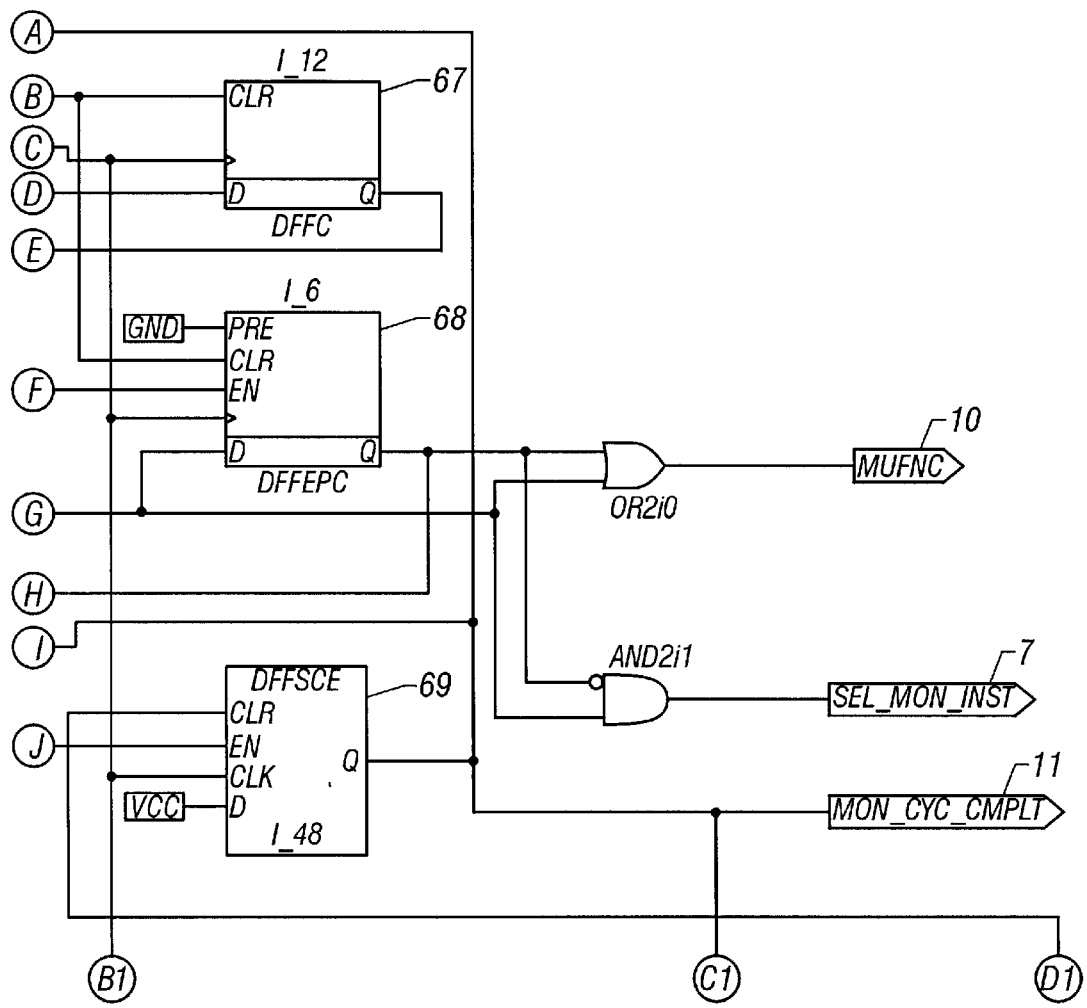
Figure 10C:
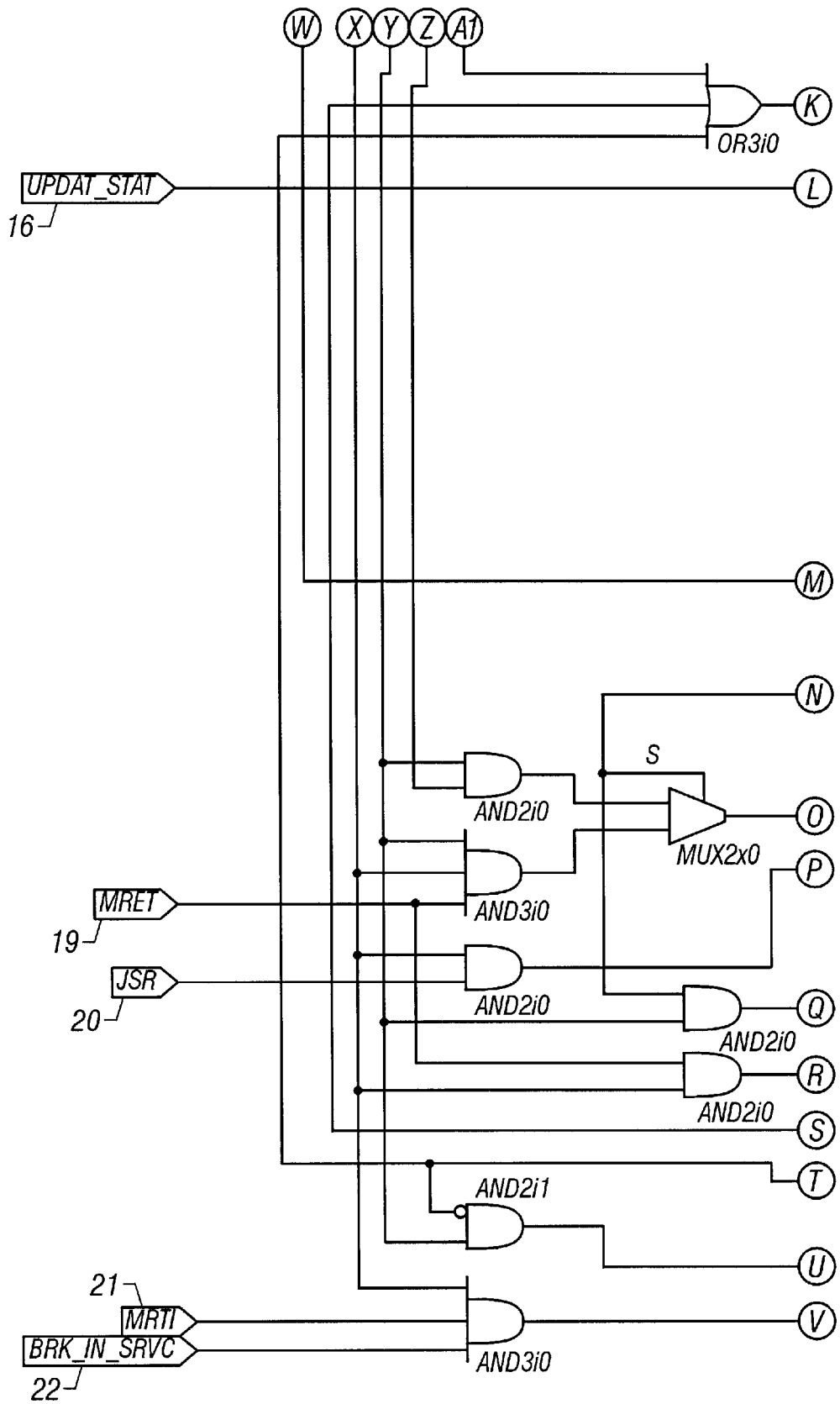
Figure 10D:
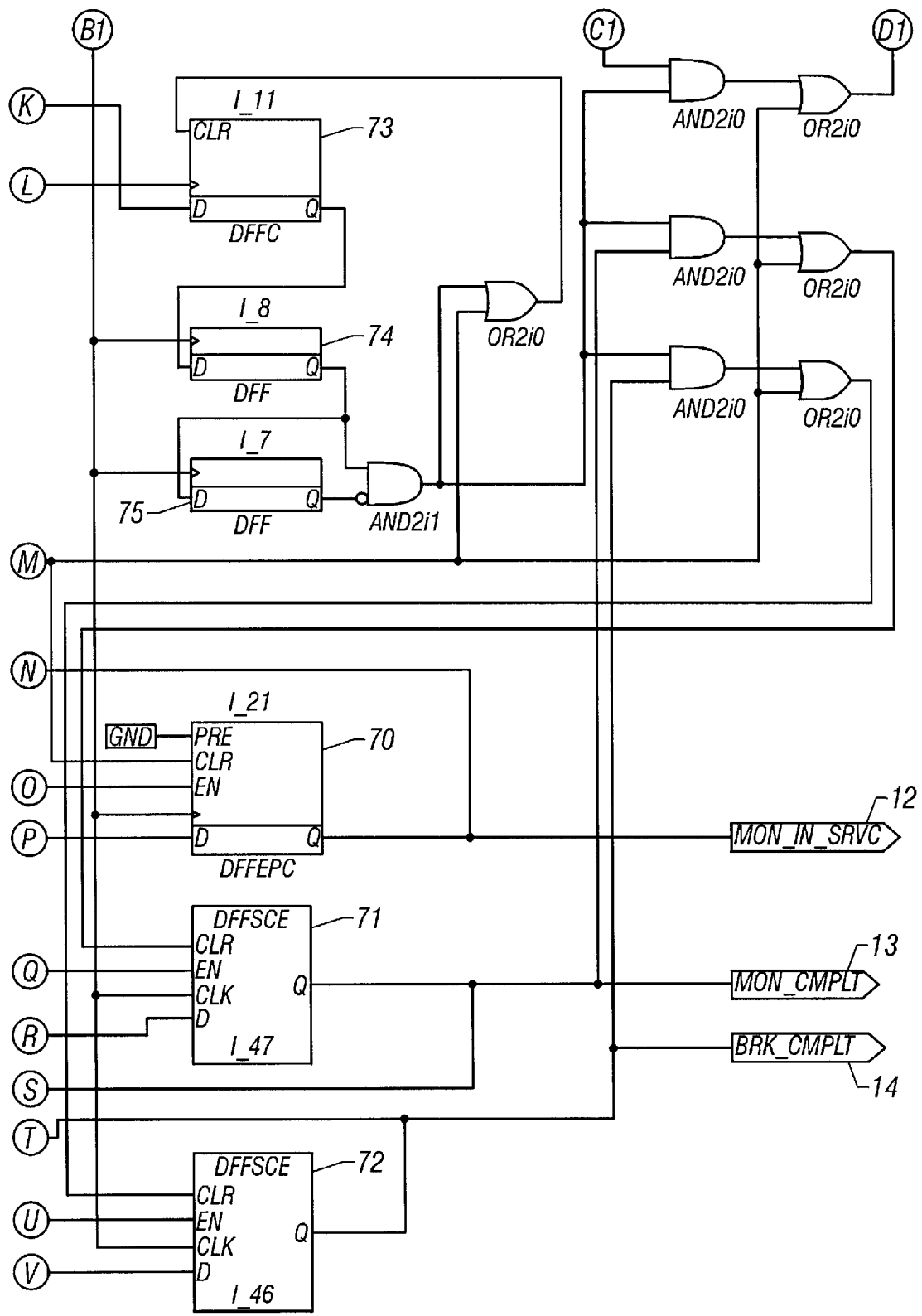

Referring to FIG. 4, the device also includes circuitry for tracking the primary program counter value 41 and, after completion of a data exchange cycle, restoring that value 41 to the primary program counter 45 without the use of interrupts or the core stack. The circuitry of FIG. 4 is responsive to the device core instruction microsequencer which also includes the data exchange instruction microsequencer logic of FIGS. 7 and 8. This logic decodes the current instruction sequence state of the sequence counter and decoder shown in FIG. 9. As with virtually any complex instruction set computer (CISC), there is a sequence of states associated with the execution of instructions. This sequence includes data movement to and from memory and registers by proper selection of data paths during each state of an instruction sequence.

The primary program counter 45 provides the address value 41 used to reference physical memory. The secondary program counter 46 tracks the primary program counter 45 during instruction fetch cycles but not necessarily during instruction execution cycles. This is particularly true during the execution of data exchange instructions where the secondary program counter 46 is frozen during data exchange instruction execution. At the end of a data exchange instruction execution sequence, the frozen secondary program counter value 42 is reloaded into both the primary and secondary program counters 45, 46. This approach eliminates the need to push the primary program counter value 41 onto the core stack in order to preserve it; and pop the value 41 from the stack in order to restore it. Since the present invention includes a prefetch cycle, the secondary program counter value 42 is decremented by one before being loaded into the primary and secondary program counters 45, 46. The secondary program counter value 42 is decremented to facilitate refetching the instruction from the primary instruction bus 1 at the address where the data exchange instruction previously pre-empted the last fetch from the primary instruction bus 1. The secondary program counter value 42 is decremented by the circuit of FIG. 5.

Figure 15A:
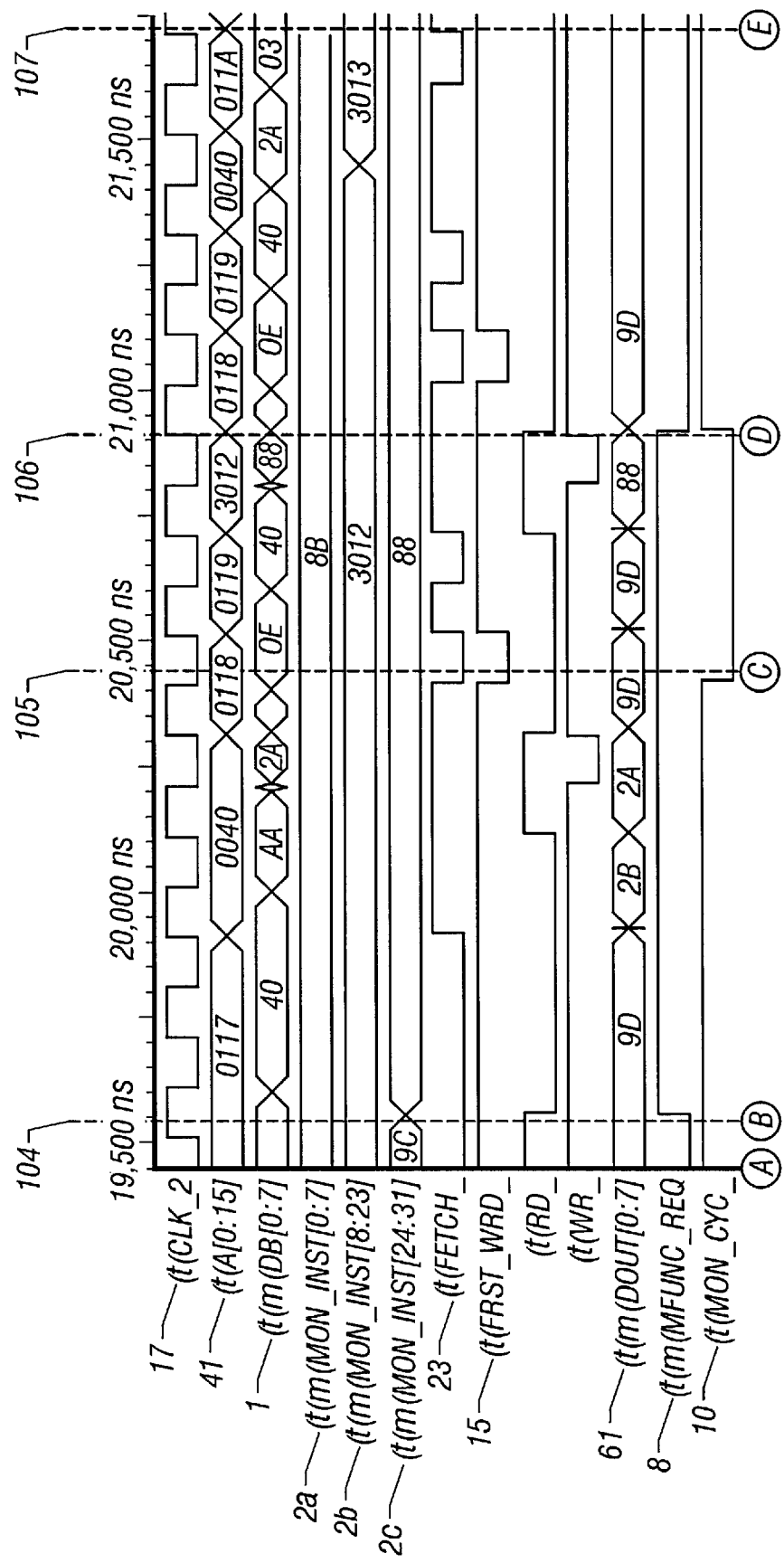
FIG. 15 is a timing diagram showing a data exchange write operation.
Figure 15B:
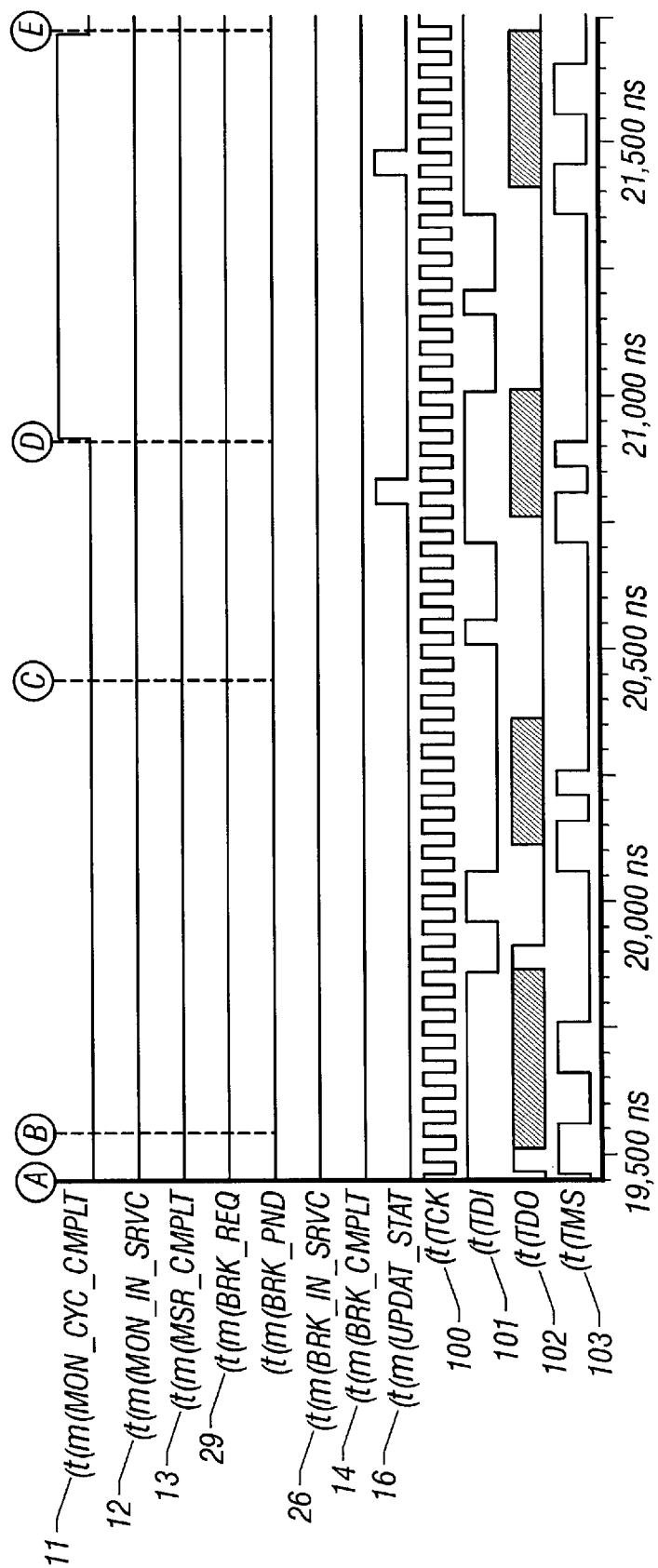

FIG. 15 shows a simulation of a data exchange write cycle. At time 104 the data exchange function request 8 is asserted. At time 105, when the next op code fetch cycle (as indicated by signals CPU_FETCH 23 and CPU_FRST_WRD 15) completes, the four-byte data exchange instruction, comprising <op_code> 2a, <address_high> <address_low> 2b, and <data> 2c, from the secondary instruction bus 2, is clocked into the core instruction register 4 in place of the instruction is available on the primary instruction bus 1. It is seen in FIG. 15 that the data exchange value field <data> 2c written to the data bus 61 between time 105 and time 106 is the data value provided in the data exchange instruction 2. Between time 105 and time 106, the data exchange signal MFUNC 10 is active low to indicate that a data exchange instruction is being fetched and executed. It can also be seen that address written to 41 is loaded into the primary program counter 45 and used as the write address.

At time 106, the address that was present during the fetch of the data exchange instruction is reloaded into the primary program counter 45 and the instruction present at the address indicated by the primary program counter value 41 is refetched and executed. In addition, the data exchange signal MON_CYC_CMPLT 11 is set high to indicate to the status sensing circuitry of FIG. 3 that the data exchange cycle is complete. It can further be seen that the data exchange write instruction takes only three clock cycles counting the prefetch cycle. At time 107, the data exchange signal MON_CYC_CMPLT 11 is cleared after the data exchange instruction presentation circuitry status register 96 is scanned as indicated by the JTAG UPDAT_STAT signal 16.

Figure 11:
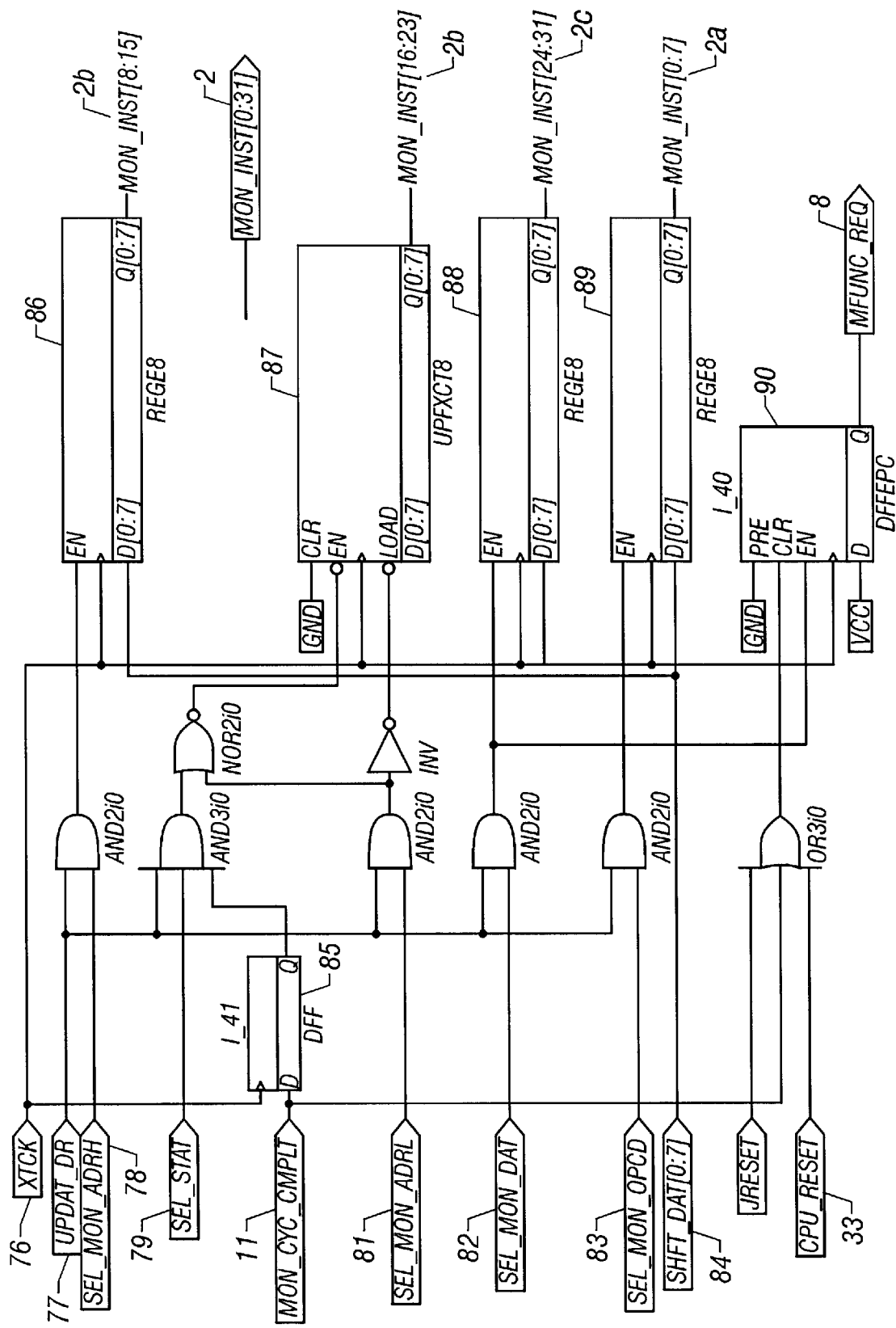
FIG. 11 is a schematic diagram of the JTAG registers used to form the 32-bit data exchange instruction.
Figure 12:
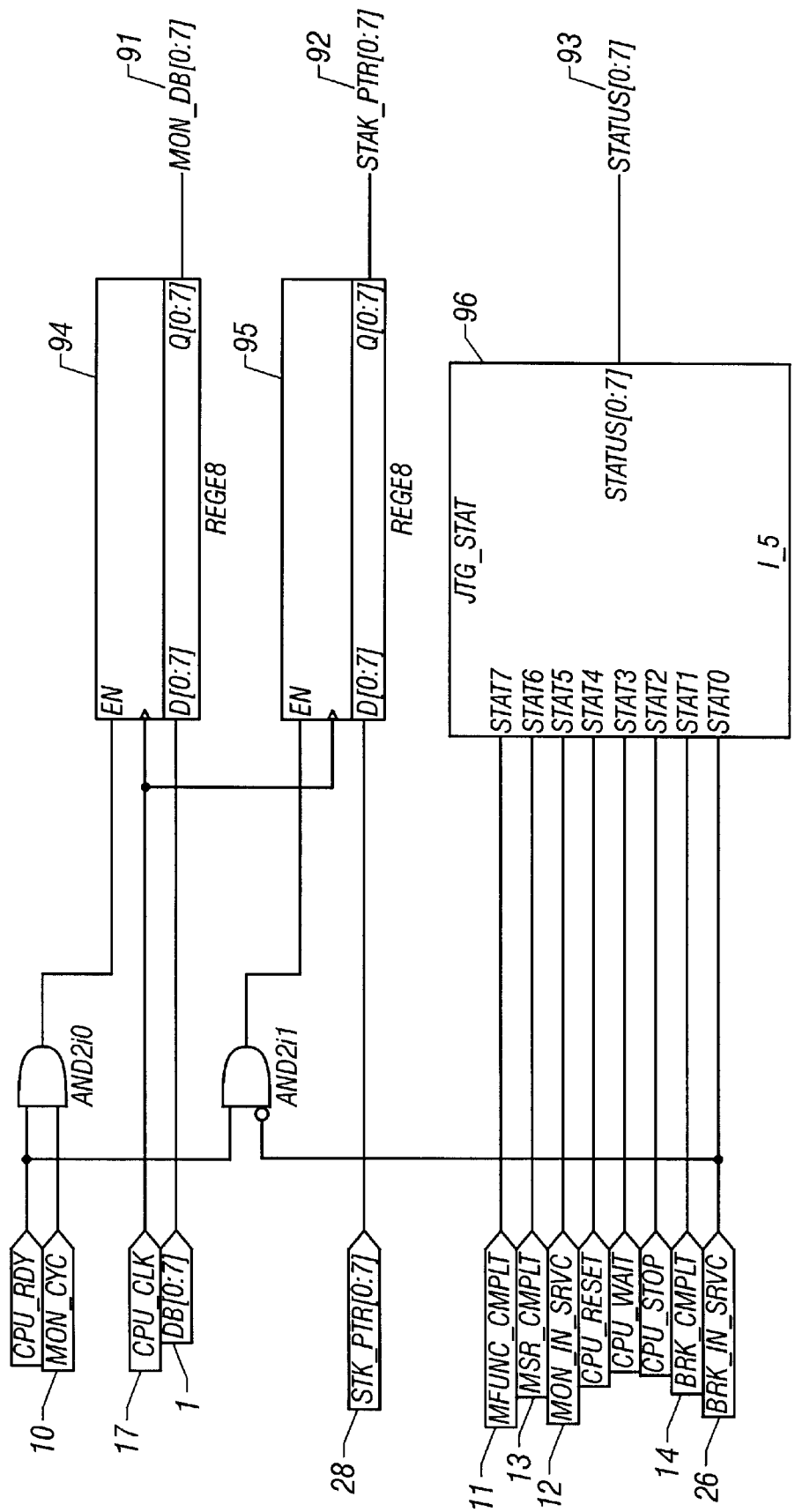
FIG. 12 is a schematic diagram for the circuitry for capturing the data from data exchange read cycles of the core, stack pointer preservation means during breakpoints, and status signals for JTAG scan operations.
Figure 16A:
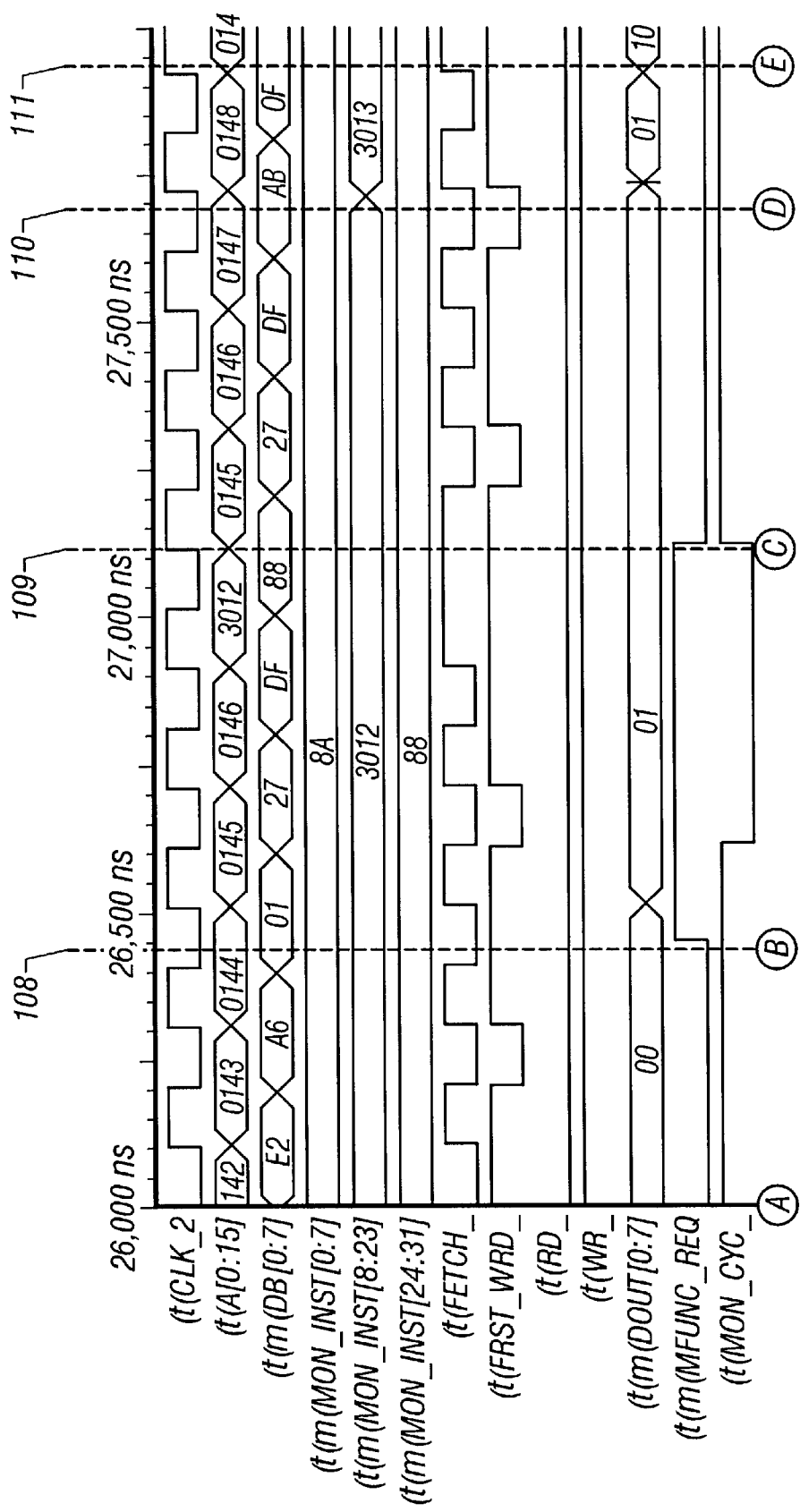
FIG. 16 is a timing diagram showing a data exchange read operation.
Figure 16B:
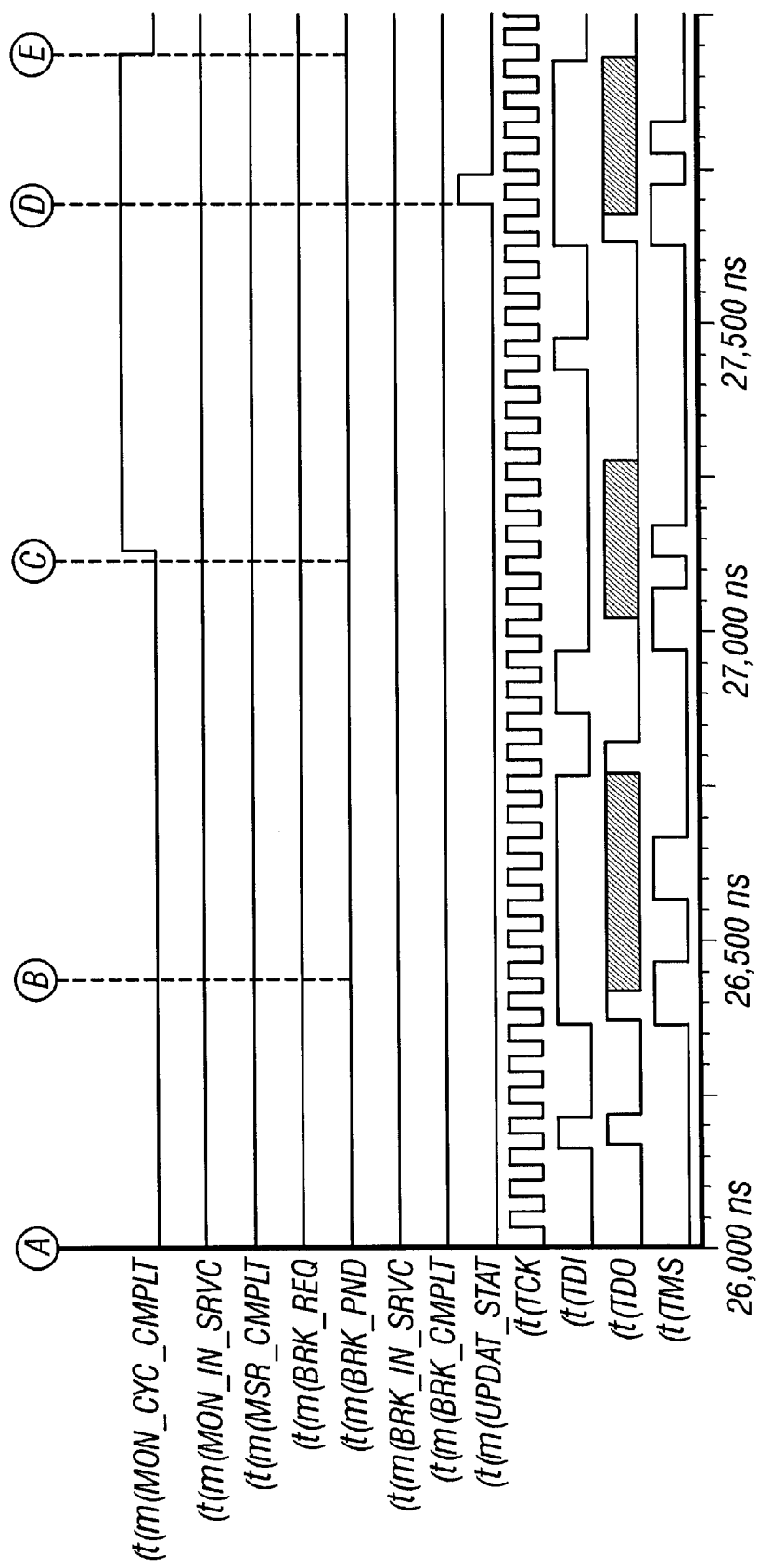

Referring to FIGS. 11, 12, and 16, the data exchange read function is initiated by presenting a data exchange read instruction to the secondary instruction bus 2 by way of the JTAG data exchange presentation circuitry 24. At time 108, a data exchange read instruction (comprising fields <op code> 2a, <address_high> <address_low> 2b, and <data> 2c) is presented to the secondary instruction bus 2 at which time the data exchange request signal MFUNC_REQ 8 goes active. It is the update of the data exchange instruction register 88 that triggers, by way of flip-flop 90, the data exchange request signal MFUNC_REQ 8. During the clock cycle prior to time 109, the data exchange address 2b of JTAG registers 86 and 87 is loaded into the primary program counter 45. At time 109 the data present on the core's data bus is clocked in to the data exchange read holding register 94 which may be retrieved by the host debug station 121 via JTAG scan of the data exchange read holding register 94 using the JTAG circuitry of FIG. 3. During data exchange read functions, the data exchange signals MON_CYC_CMPLT 11 and MON_IN_SRVC 12 are set and cleared in the same way as for data exchange write cycles.

Figure 19A:
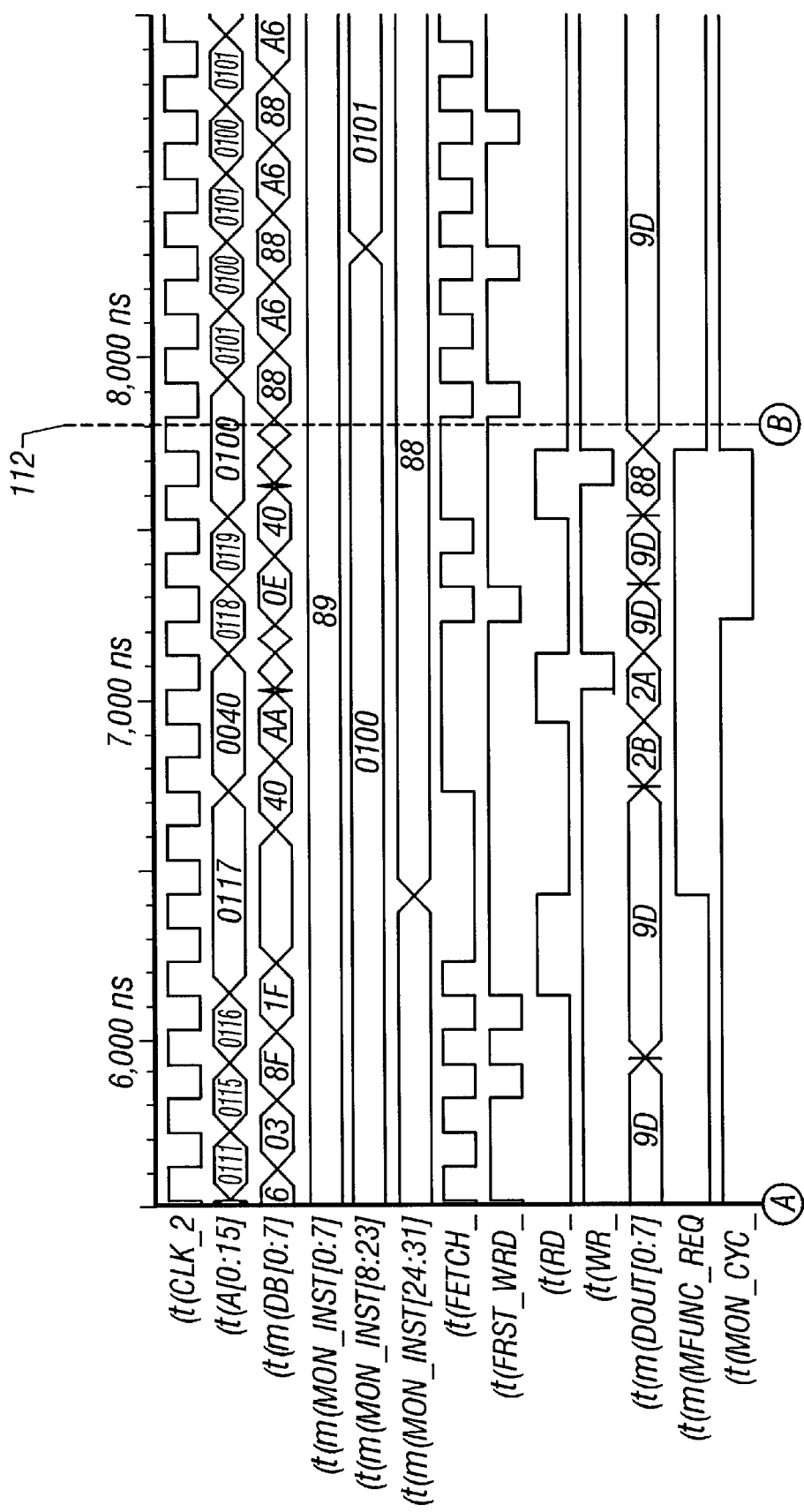
FIG. 19 is a timing diagram showing a data exchange WORM using an LOI instruction.
Figure 19B:
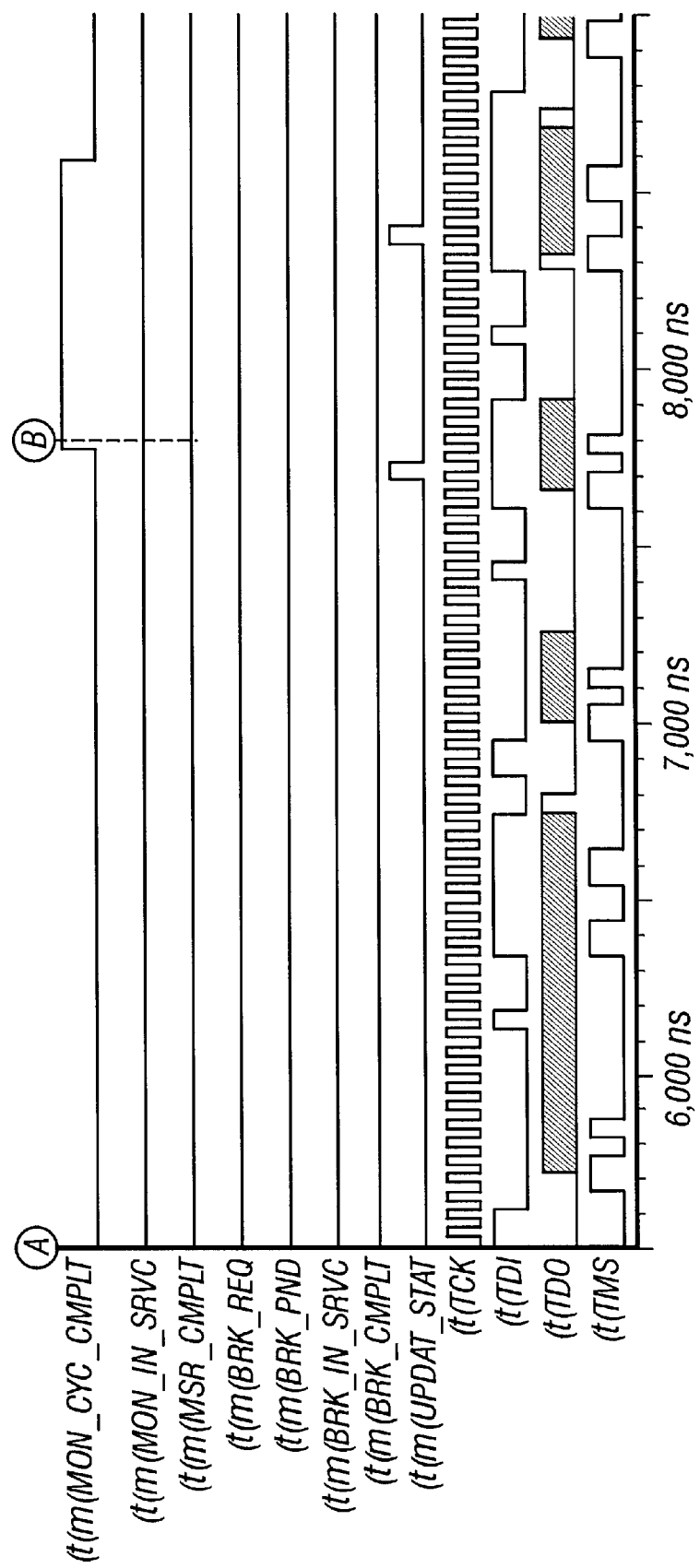

One method of the present invention, represented by operation of the data exchange instructions WORM and LOI, consists of forcing the device core to repeatedly read from and write to a single RAM location without the use of a breakpoint or interrupt. The WORM instruction executes a data exchange write cycle to an address followed by a jump to that address. In the timing diagram shown in FIG. 19, the WORM instruction consists of the WORM op code field 2a, the address to write and jump to 2b, and the value to be written 2c. In this case, the value to be written 2c is the LOI instruction (see below for description of the LOI instruction). Hence, it can be seen that the device core is essentially trapped at the WORM address. The device core can be freed from the trap by WORM-ing a non-LOI instruction to a known thread of code or by WORM-ing with the original op code that was present at the address prior to the WORM execution. Time 112 shows the write of an LOI instruction followed by a jump to the WORM address. As with data exchange read and write instructions, data exchange signals MON_CYC_CMPLT 11 and MON_IN_SRVC 12 are set and cleared in the same manner.

Figures 1, 17A:
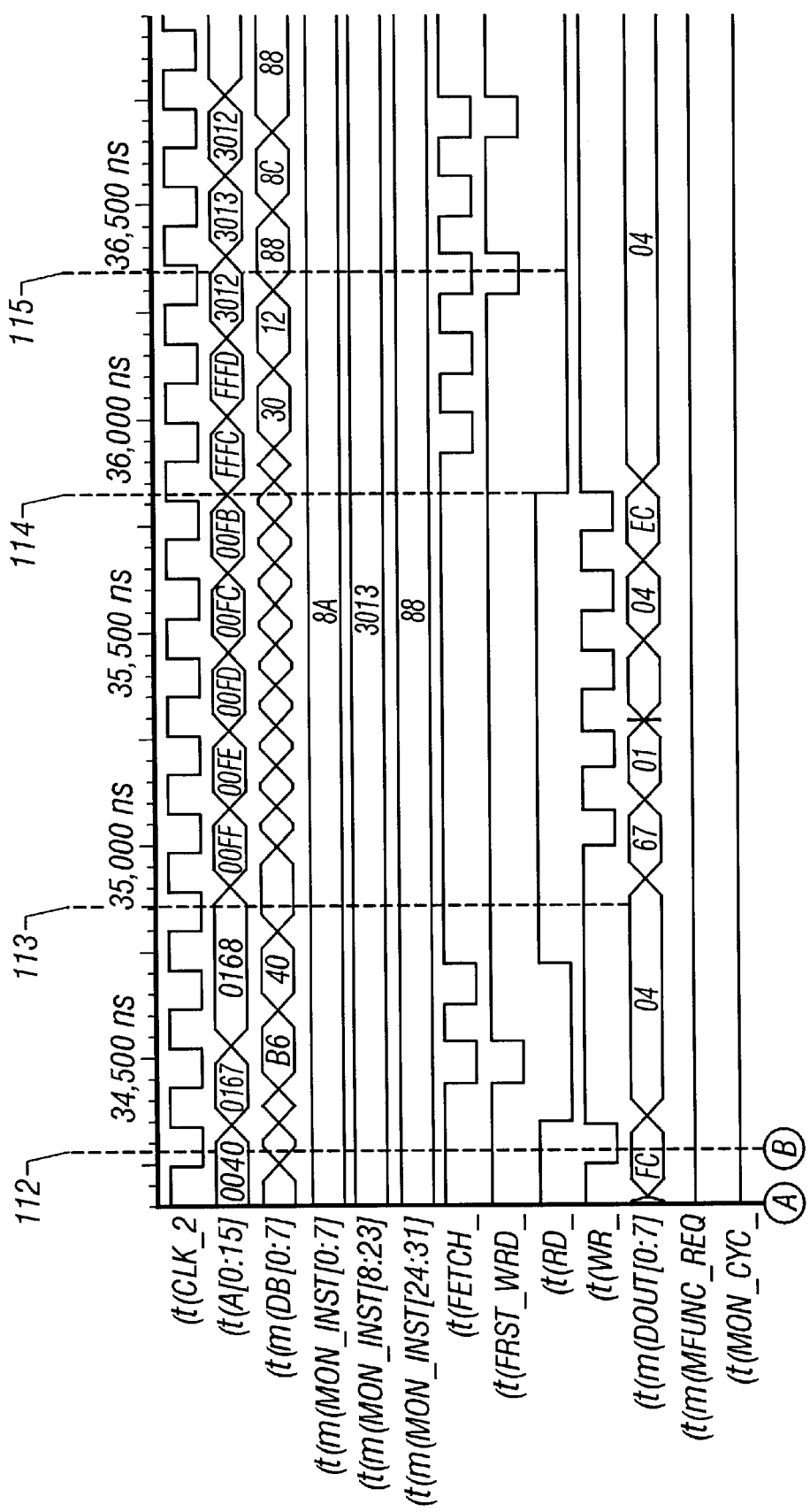
FIGS. 17a and 17b are timing diagrams showing a breakpoint entry and exit.
Figures 2, 17A:
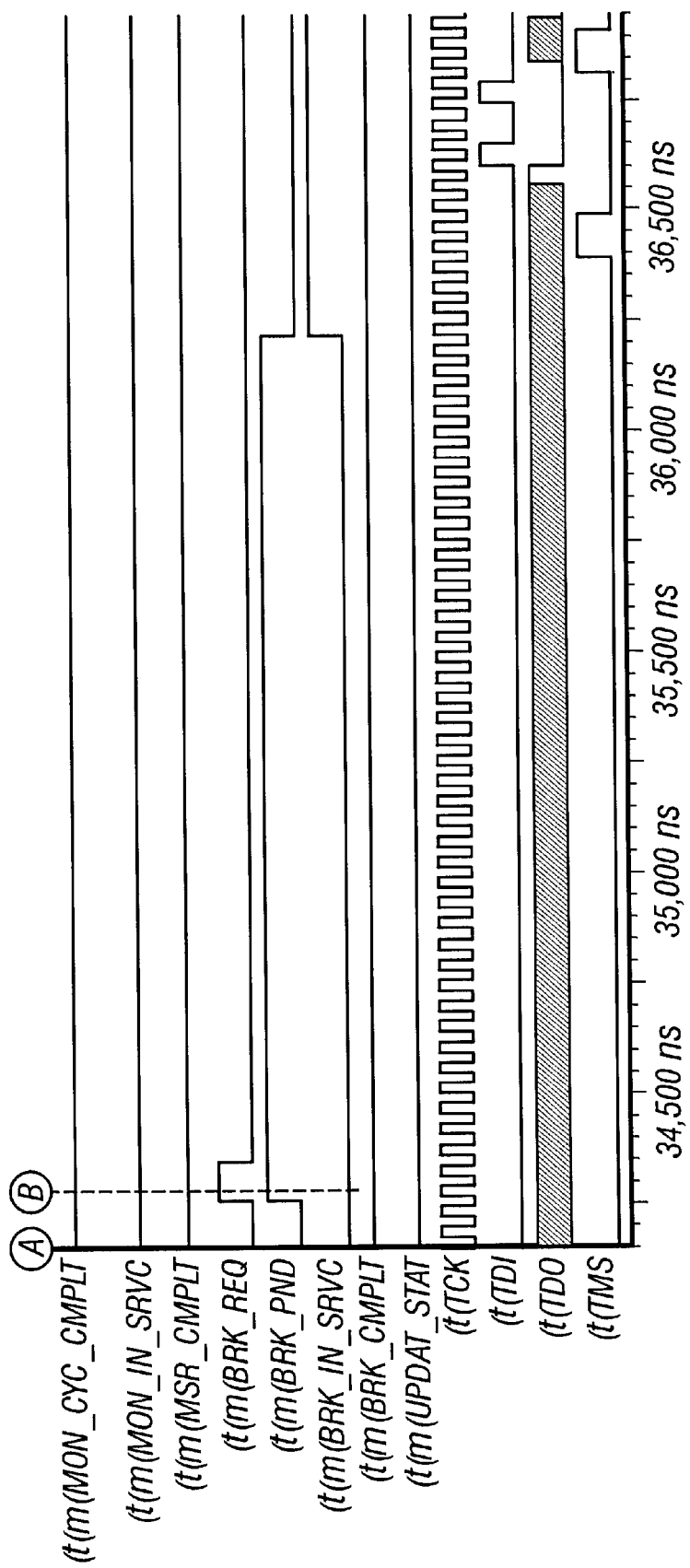
Figures 1, 17B:
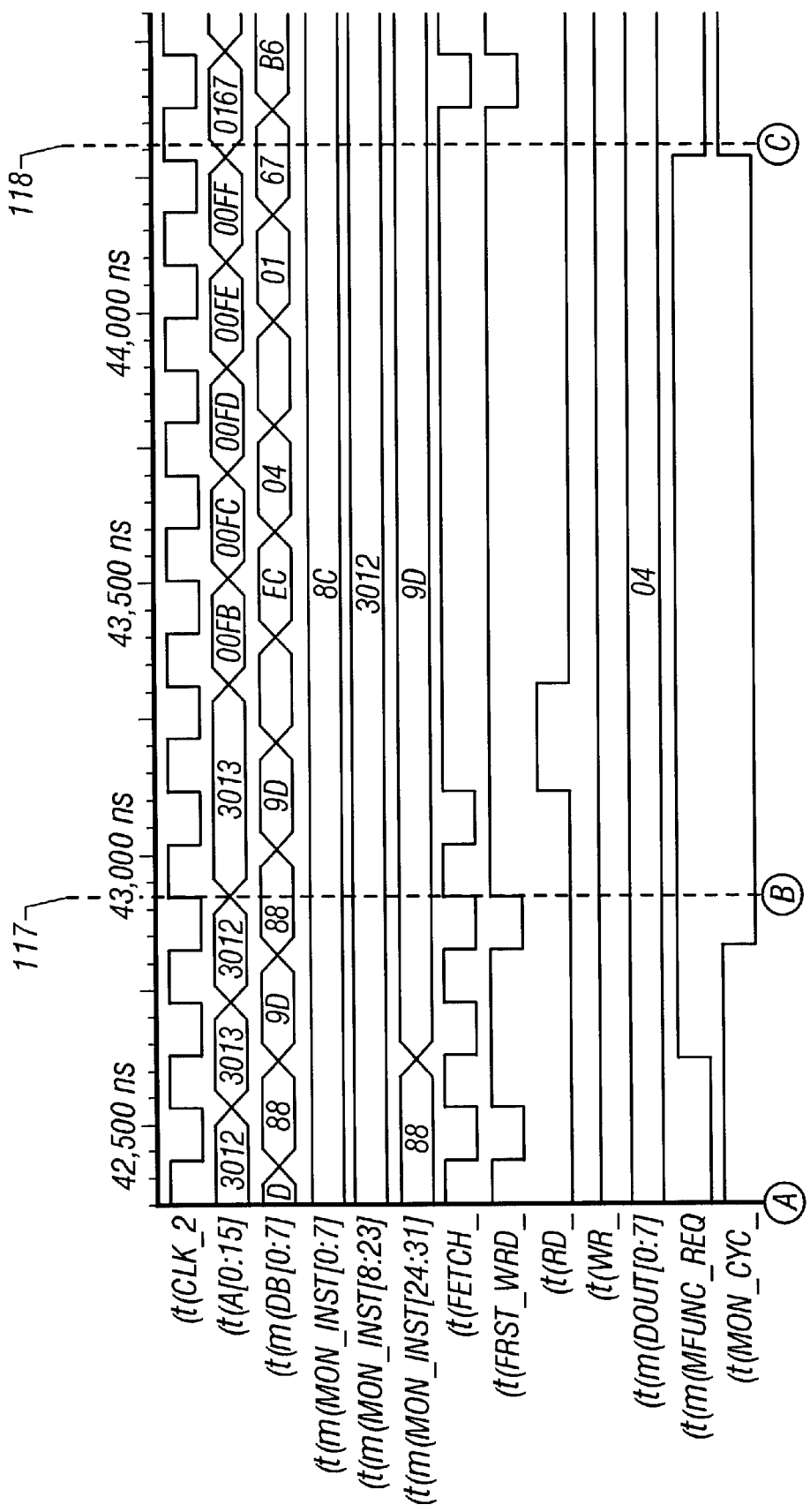
Figures 2, 17B:
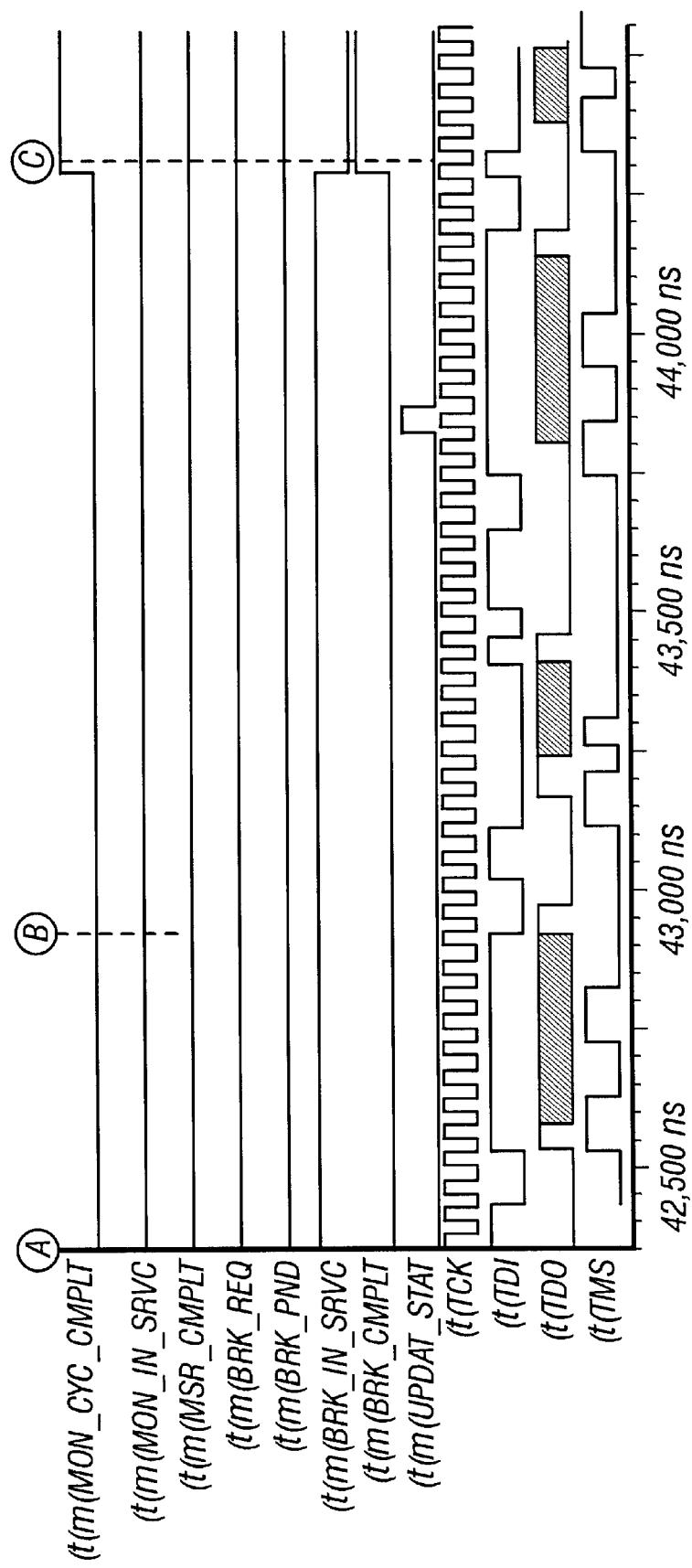

Referring to FIG. 17a and FIG. 17b, another method of the invention supports both hardware and software breakpoints, along with single-step capability while allowing background processes to continue. FIGS. 17a, 17b show a timing diagram of the operation of a data exchange break cycle. At time 112, a device core break request is asserted on data exchange signal BRK_REQ (break request) 29 causing the data exchange signal BRK_PND (break pending) 25 to go active high. At time 113, a context save operation is performed by pushing the program counter, X register, accumulator, and condition code onto the core stack followed by a breakpoint fetch at time 114. Referring to FIGS. 13 and 14, the data exchange breakpoint method of the present invention includes use of the LOI (loiter) instruction 98. The LOI data exchange instruction is, in effect, a one-byte jump to itself. One aspect of the method of data exchange breakpoints is to provide a service routine that is either one byte or two bytes long depending on whether background processes are enabled during debug mode. If it is desired that background processes continue during breakpoint mode, then the breakpoint service routine of FIG. 13 is provided either by downloading on-the-fly via the data exchange write function prior to enabling breakpoints; or by including the breakpoint service routine as part of the foreground process. If it is desired that background processes be disabled during breakpoints or single-stepping, then the breakpoint service routine of FIG. 14 is used. It can be seen from FIG. 17a and FIG. 17b that the LOI instruction 98 is fetched at time 115 and continues to fetch itself, during which time background processes area allowed to interrupt the LOI fetches if interrupts are enabled by the breakpoint service routine such as the one shown in FIG. 13. Also at time 115, the data exchange signal BRK_IN_SRVC 26 is set active high to indicate that a data exchange break is in service.

The final part of the method for data exchange breakpoints is to present to the secondary instruction bus 2 a data exchange instruction return from breakpoint (RETB) as shown in FIG. 17b. In the timing diagram of FIG. 17b, the core is held at the data exchange breakpoint service routine (FIG. 13) continually fetching and executing the LOI instruction 98 until a data exchange signal MON_CYC 10 occurs at time 117 as result of a JTAG data exchange request signal MFUNC_REQ 8. The JTAG data exchange instruction presentation circuitry 24 as shown in FIG. 11 was previously programmed with the RETB op code via JTAG scan path shift/update cycles. The RETB instruction is fetched (instead of the LOI instruction 98 present on the primary instruction bus 1) and executed. Upon execution of the RETB instruction, the context of the device prior to the breakpoint is restored and the instruction which was on the primary instruction bus 1 prior to the breakpoint is executed at time 118. Additionally at time 118, data exchange signal BRK_CMPLT (break complete) 14 is set active high after capturing, shifting and updating the data exchange JTAG status register 96 of FIGS. 3 and 12.

To facilitate uploading and downloading of programs and data into the core's application memory space, a circuitry for automatically post-incrementing the lower eight bits of the data exchange instruction address field 2b is shown in FIG. 11. As can be seen from FIG. 11, a data exchange signal MON_CYC_CMPLT 11 is sampled with each JTAG clock cycle (XTCK 76). On the next reading of the JTAG data exchange status register 96, the lower eight bits will be incremented when SEL_STAT 79 goes active during the status register read.

Another method of the present invention retrieves, by way of data exchange read cycles, the context that was saved during the monitor breakpoint cycle. Retrieval is performed by first scanning the core's stack pointer value 28 at the time of the breakpoint context save completion which is captured by a register 95 present in the JTAG block of FIG. 3. A data exchange read instruction is constructed with the register's output value 92 using JTAG registers 86, 87, 88, and 89 (FIG. 11) whereby the register values of the core's current context are retrieved from the core's stack memory address one by one. The core register values may be modified by changing the values stored at their respective stack addresses using data exchange writes prior to presenting the monitor RETB instruction.

Figure 5:
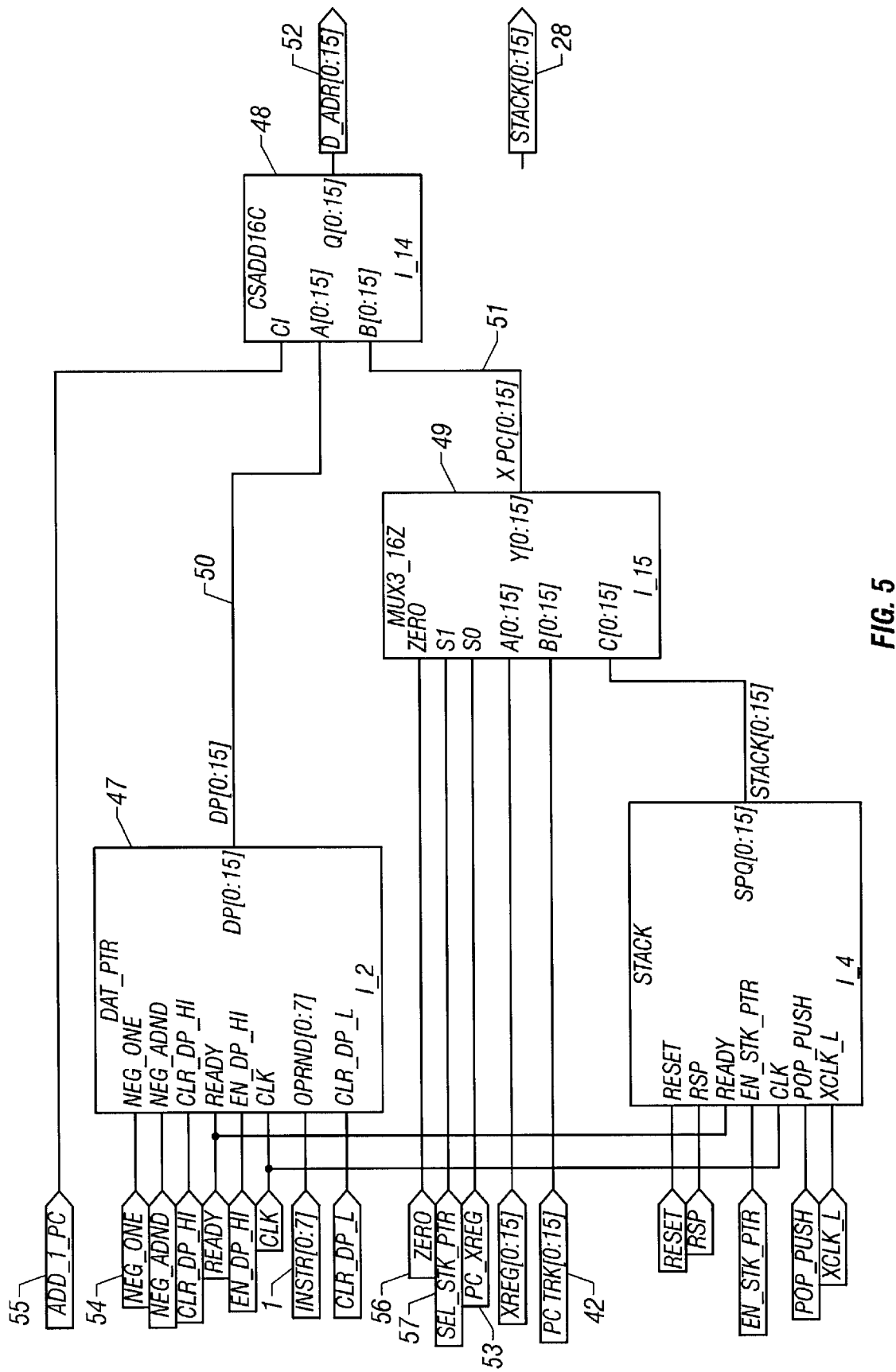
FIG. 5 is a schematic diagram of the address calculation logic of the present invention.
Figure 6:
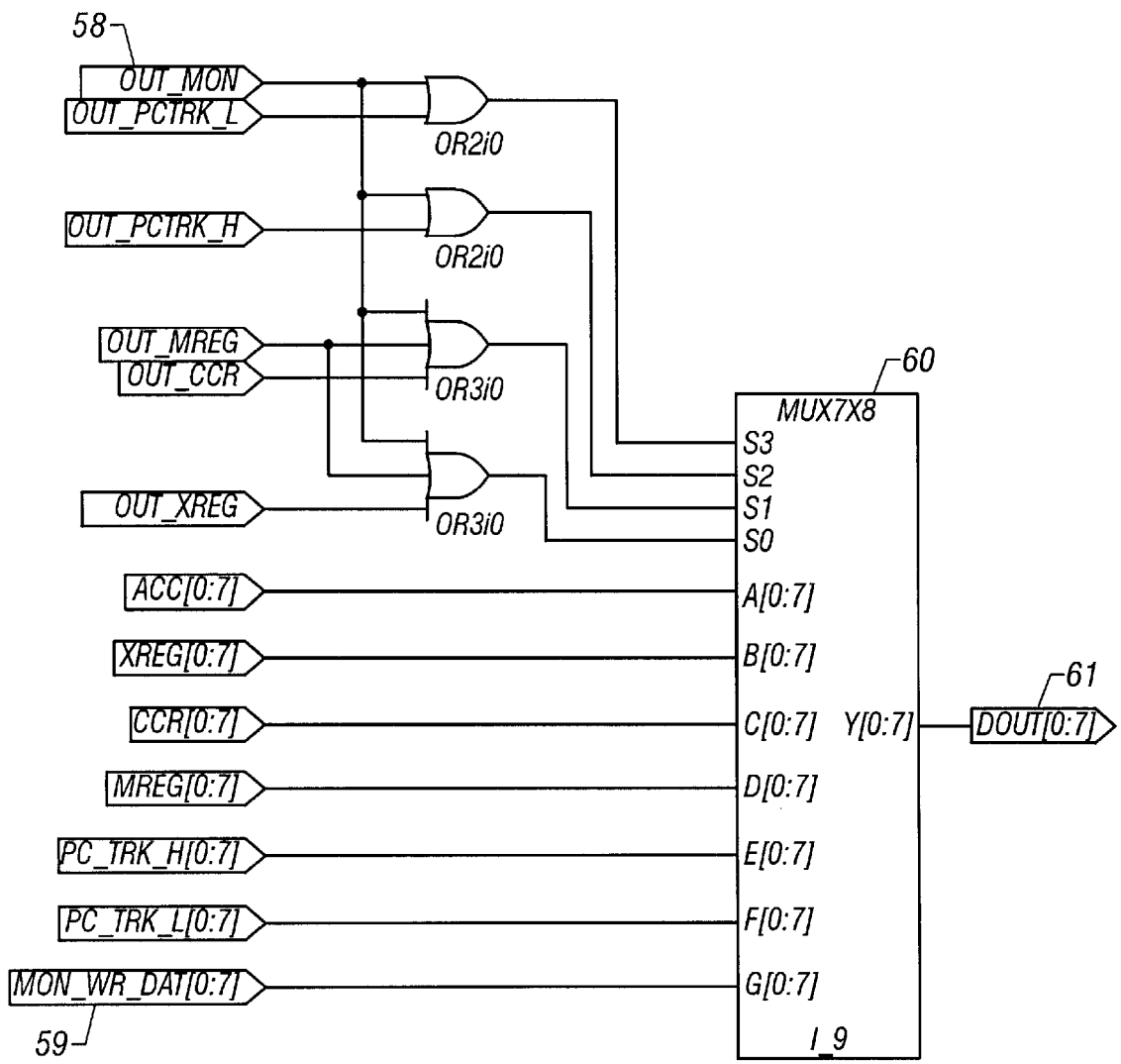
FIG. 6 is a schematic diagram of the circuitry for presenting instructions for write operations.
Figure 18A:
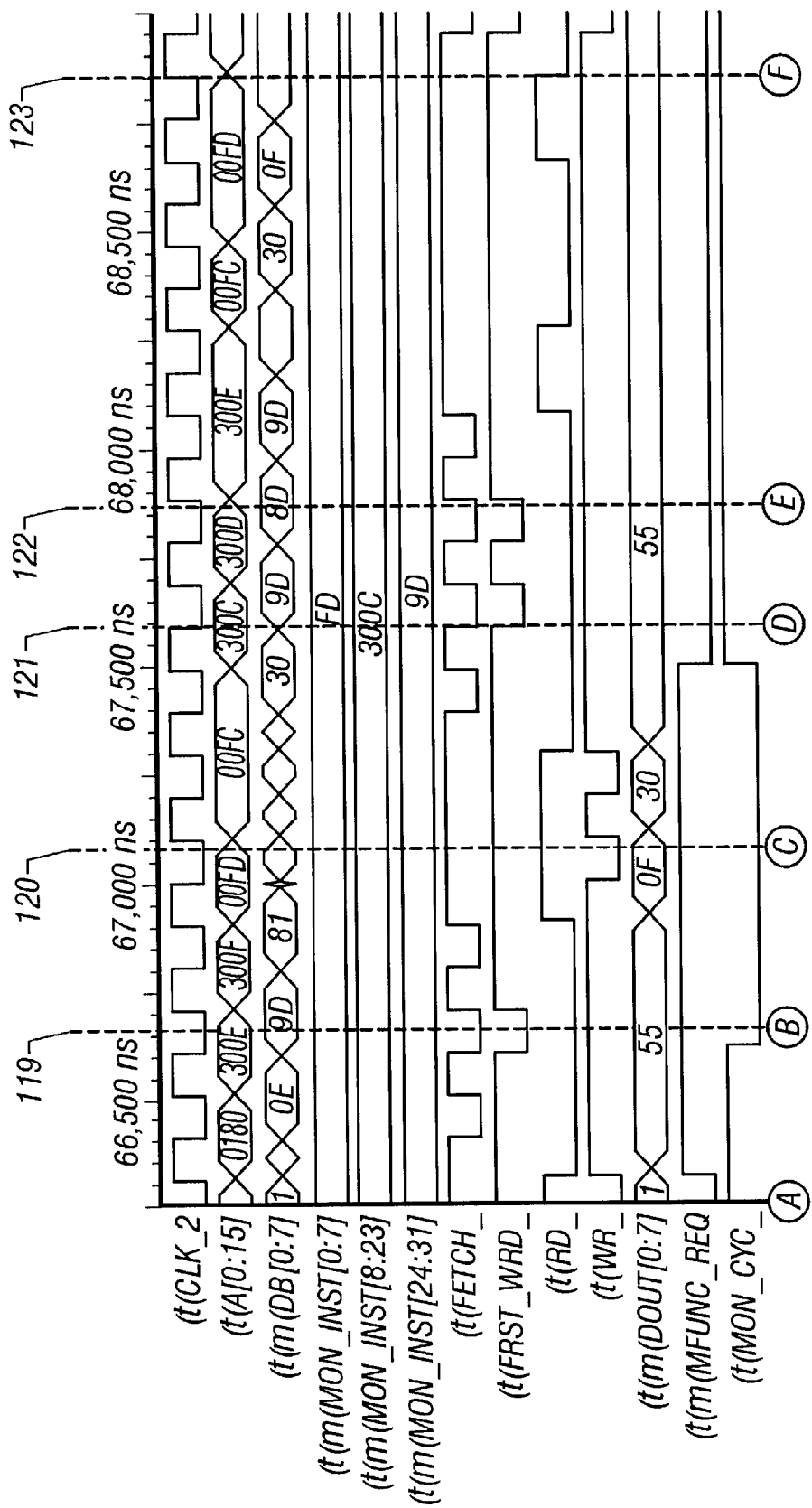
FIG. 18 is a timing diagram showing a data exchange subroutine operation.
Figure 18B:
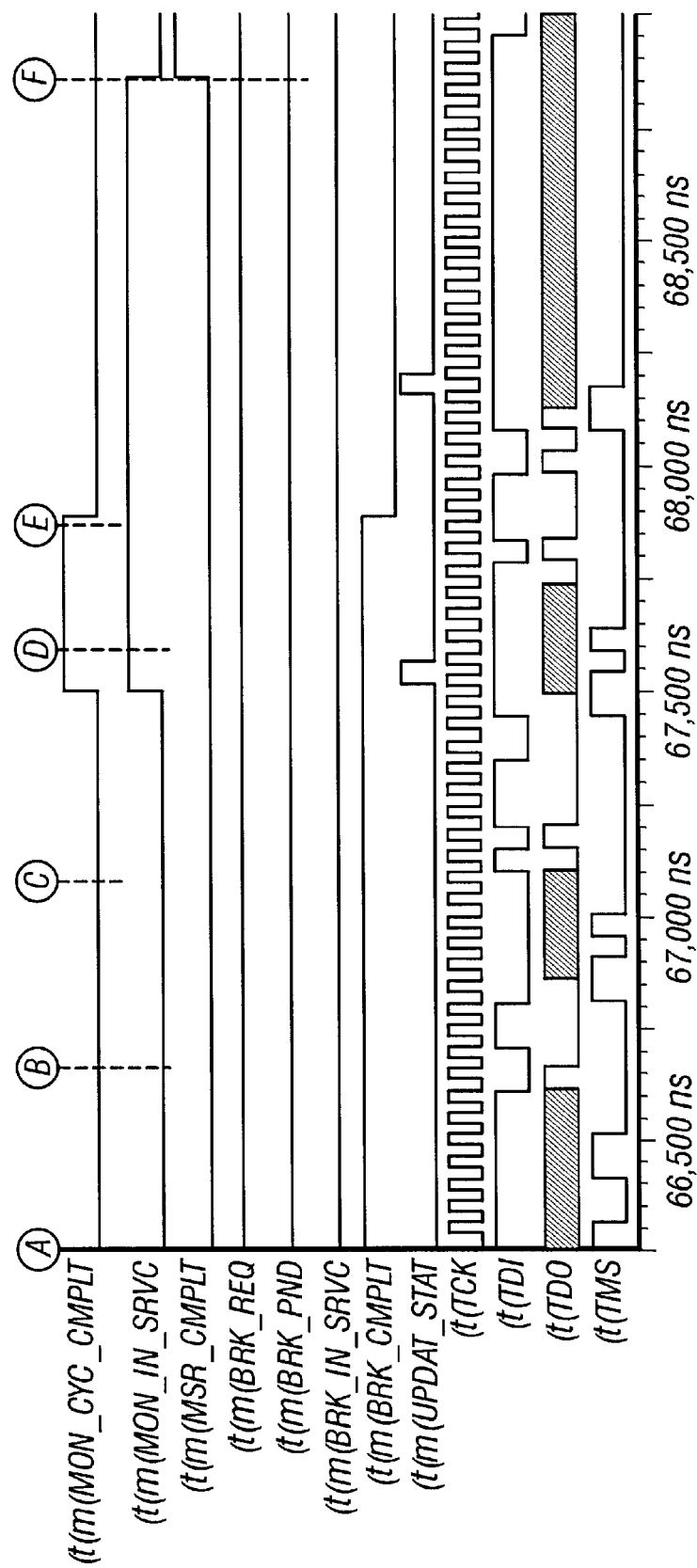

Another method of the present invention summons a subroutine on the fly from the debugger user interface. FIG. 18 is a timing diagram of such a method. To practice this method, the device core's "jump to subroutine" (JSR) micro-sequencer logic is enhanced as shown in FIG. 8 to include JSR instructions off the alternate instruction bus 2. To support monitoring the status of the data exchange subroutines, data exchange signals MON_IN_SRVC 12 and 13 MSR_CMPLT are provided and may be read from the JTAG data exchange status register 96. As can be seen in FIGS. 4, 5, and 8, the data exchange JSR instruction behaves much like the typical "JSR, X" instruction except that instead of using the contents of the X register as the destination address, the contents of registers 86 and 87 (FIG. 11) are used as the destination address.

Also as part of the method of data exchange subroutines, a data exchange RETM (return from subroutine) has been added to the present invention's instruction set. The RETM instruction behaves like a typical return from subroutine instruction except that execution of the instruction clears the data exchange signal MON_IN SRVC 12, which indicates a data exchange routine is in service, and sets data exchange signal MSR_CMPLT 13 which indicates the data exchange subroutine is complete. Another difference is that the program counter value pulled off the stack is decremented by one before it is finally loaded into the primary program counter 45 and secondary program counter 46 during the last state of the sequence. This allows the core to refetch the instruction present on the primary instruction bus 1 when the data exchange JSR request was first made.

Figure 20:
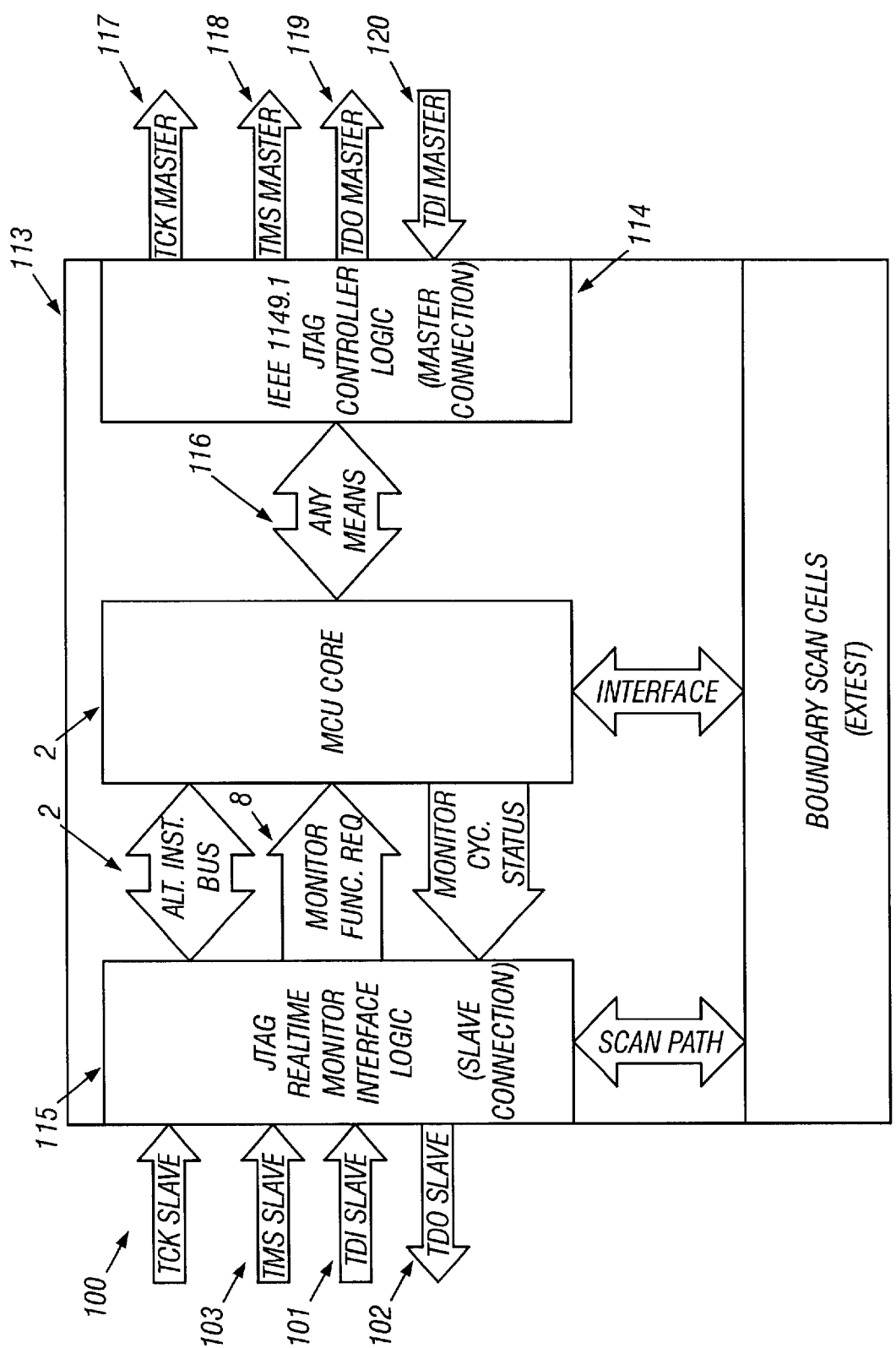
FIG. 20 is a block diagram showing a data exchange JTAG scan engine
Figure 21:
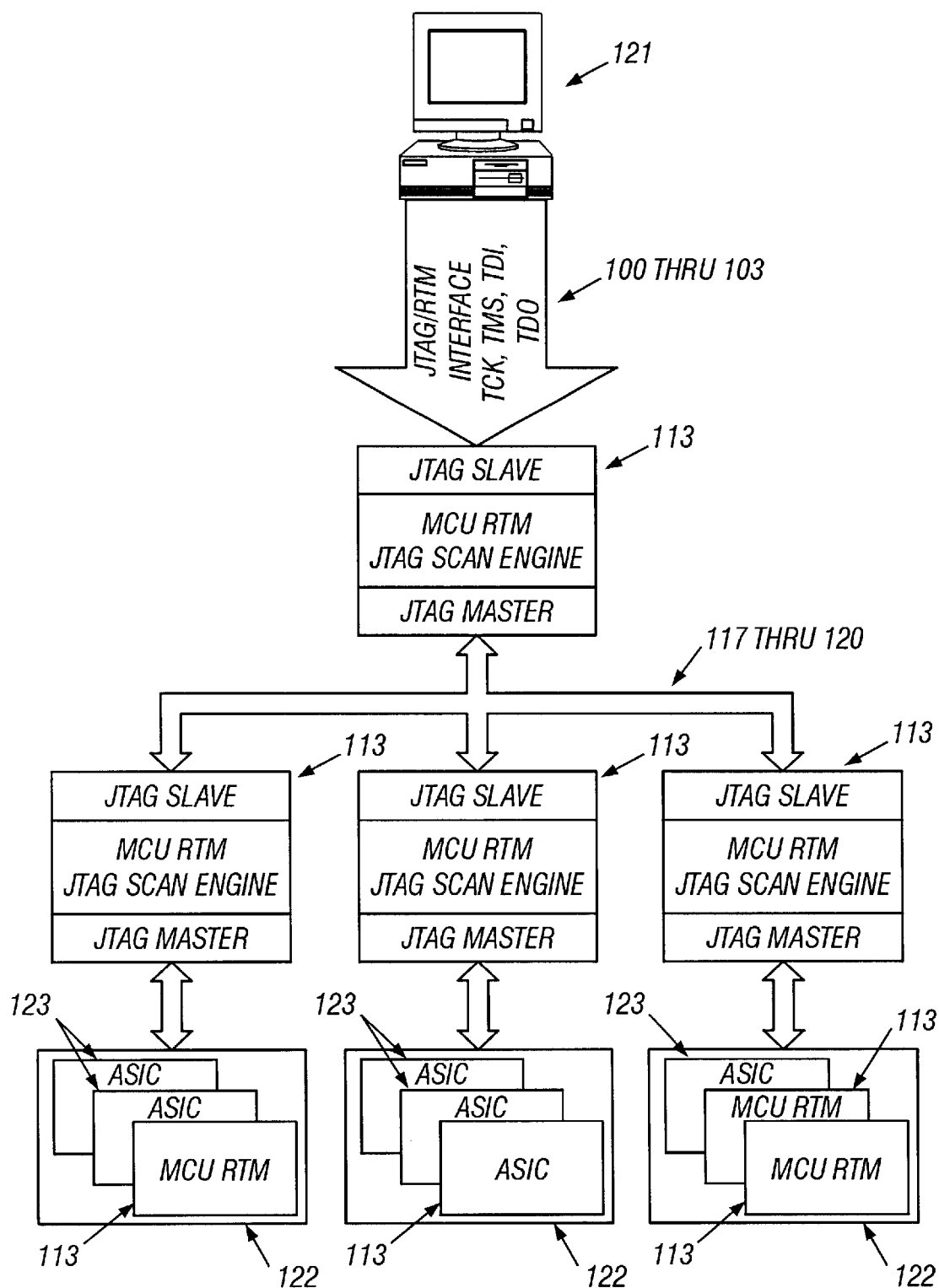
FIG. 21 is a block diagram showing multiple data exchange microcomputing devices configured in a hierarchical array arrangement.

A further embodiment of the present invention includes the array processing and debugging device revealed in FIGS. 20 and 21. Referring to FIG. 20, there is seen a block diagram of a JTAG scan engine 130 that consists of a device core 132, a JTAG-based data exchange instruction presentation circuitry 134, and a master JTAG controller port 136. The master JTAG controller port 136 can be implemented either in logic or software or both. JTAG signals 100, 101, 102, and 103 are connected to either a host monitoring and debug station 121 or another JTAG scan engine 130 hierarchically arranged as its master as shown in FIG. 21. Signals 140, 142, 144, and 146 are connected to slave devices such as JTAG-compliant microcomputing units, JTAG scan engines 130, or application-specific integrated circuits (ASICs) 150.

Referring to FIG. 21, there can be seen a system consisting of a plurality of JTAG scan engines 130 arranged in a hierarchical fashion as an array of processors and JTAG-complaint ASICs 150. The system includes a host computer 121 for real-time monitoring and debugging functions. From the master-slave configuration of the JTAG scan engines 130, it is apparent that there is virtually no limit to the breadth or depth of nesting levels that the array processor may have. Each master JTAG scan engine 130 may have a plurality of slave JTAG scan engines 130 or ASICs 150; each of which may in turn be a master JTAG scan engine 130 to any number of slaves.

The preferred method for the host computer 121 or the JTAG scan engine 130 at the highest level to monitor devices at a lower level is by way of presenting data exchange instructions using the methods and devices previously described. Another method is to have data exchange subroutines present, or downloaded, via the JTAG scan path, which relay data exchange instructions from a higher level device to a loawer level device via the higher level device's master JTAG controller port 136. Each JTAG scan engine would always have the required software capability present to perform the requested data exchange task whether the software was permanently resident or downloaded on-the-fly via the data exchange architecture.

There has been described and illustrated herein, microcomputing devices capable of data exchange and methods for performing such data exchange with zero software overhead. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed and desired to be secured by Letters Patent is as follows:

1. A microcomputing device adapted to exchange data with an external device while said microcomputing device is executing an application program in run time or in single step mode, said microcomputing device comprising:
   a device core responsive to application program instructions and data exchange instructions, said device core including a primary program counter;
   at least one primary instruction bus that presents said application program instructions to said device core;
   at least one secondary instruction bus that presents said data exchange instructions to said device core;
   an instruction bus selection circuit that controls to which of said instruction buses said device core will respond;
   at least one data exchange external interface adapted to collectively:
      accept said data exchange instructions from an external device and present said data exchange instructions to said secondary instruction bus; and
      accept data and status information regarding data exchange from elements of said microcomputing device other than said data exchange external interface and provide said data and status information regarding data exchange to an external device; and
   a means for preserving and restoring contents of said primary program counter without the use of a core stack of said microcomputing device.

2. The microcomputing device as recited in claim 1 wherein at least one of said data exchange external interfaces is a Joint Test Advisory Group (JTAG), Institute of Electrical and Electronics Engineers (IEEE) 1149.1 compliant interface.

3. The microcomputing device as recited in claim 1 wherein said means for preserving and restoring said primary program counter of said microcomputing device further comprises:
   a secondary program counter that is loaded and incremented in parallel with said primary program counter where said secondary program counter is halted during execution of said data exchange instructions and contents of said secondary program counter are reloaded to a fetch address of an instruction being fetched from said primary instruction bus immediately prior to the execution of said data exchange instructions and then at the end of said data exchange instructions execution, contents of said secondary program counter are loaded into said primary and secondary program counters.

4. A microcomputing device adapted to exchange data with an external device while said microcomputing device is executing an application program in run time or in single step mode, said microcomputing device comprising:
   a device core responsive to application program instructions and data exchange instructions, said device core including a primary program counter;
   at least one primary instruction bus that presents said application program instructions to said device core;
   at least one secondary instruction bus that presents said data exchange instructions to said device core;
   an instruction bus selection circuit that controls to which of said instruction buses said device core will respond;
   at least one data exchange external interface adapted to collectively:
      accept said data exchange instructions from an external device and present said data exchange instructions to said secondary instruction bus; and
      accept data and status information regarding data exchange from elements of said microcomputing device other than said data exchange external interface and provide said data and status information regarding data exchange to an external device; and
   a secondary program counter that is loaded and incremented in parallel with said primary program counter, wherein said secondary program counter is halted during execution of said data exchange instructions and contents of said secondary program counter are reloaded to a fetch address of an instruction being fetched from said primary instruction bus prior to the execution of said data exchange instructions and then at the end of said data exchange instructions execution, contents of said secondary program counter are loaded into said primary and secondary program counters.

5. A Joint Test Advisory Group (JTAG) scan engine having a microcomputing device adapted to exchange data with an external device while said microcomputing device is executing an application program in run time or in single step mode, said microcomputing device comprising:
   a device core responsive to application program instructions and data exchange instructions, said device core including a primary program counter;
   at least one primary instruction bus that presents said application program instructions to said device core;
   at least one secondary instruction bus that presents said data exchange instructions to said device core;
   an instruction bus selection circuit that controls to which of said instruction buses said device core will respond;
   at least one Joint Test Advisory Group (JTAG), Institute of Electrical and Electronics Engineers (IEEE) 1149.1 compliant data exchange external interface adapted to collectively:
      accept said data exchange instructions from an external device and present said data exchange instructions to said secondary instruction bus; and
      accept data and status information regarding data exchange from elements of said microcomputing device other than said data exchange external interface and provide said data and status information regarding data exchange to an external device;
   a means for preserving and restoring contents of said primary program counter without the use of a core stack of said microcomputing device; and
   a JTAG controller port, said JTAG controller port combined onto the same substrate with said microcomputing device in a manner that said JTAG controller port is functional and operative with said microcomputing device wherein said JTAG controller port is under the control of said microcomputing device.

6. An array processor system having a plurality of Joint Test Advisory Group (JTAG) scan engines, each of said JTAG scan engines having a microcomputing device adapted to exchange data with an external device while said microcomputing device is executing an application program in run time or in single step mode, said microcomputing device comprising:
   a device core responsive to application program instructions and data exchange instructions, said device core including a primary program counter;

at least one primary instruction bus that presents said application program instructions to said device core;

at least one secondary instruction bus that presents said data exchange instructions to said device core;

an instruction bus selection circuit that controls to which of said instruction buses said device core will respond;

at least one Joint Test Advisory Group (JTAG), Institute of Electrical and Electronics Engineers (IEEE) 1149.1 compliant data exchange external interface adapted to collectively:

accept said data exchange instructions from an external device and present said data exchange instructions to said secondary instruction bus; and accept data and status information regarding data exchange from elements of said microcomputing device other than said data exchange external interface and provide said data and status information regarding data exchange to an external device;

a means for preserving and restoring contents of said primary program counter without the use of a core stack of said microcomputing device; and a JTAG controller port, said JTAG controller port combined onto the same substrate with said microcomputing device in a manner that said JTAG controller port is functional and operative with said microcomputing device, wherein said JTAG controller port is under the control of said microcomputing device;

wherein said JTAG scan engines are arranged so there is at least one master scan engine and at least one slave scan engine, said slave scan engine being responsive to data exchange instructions presented by said master scan engine.

7. A debug and test system having an array processor system having a plurality of Joint Test Advisory Group (JTAG) scan engines, each of said JTAG scan engines having a microcomputing device adapted to exchange data with an external device while said microcomputing device is executing an application program in run time or in single step mode, said microcomputing device comprising:

a device core responsive to application program instructions and data exchange instructions, said device core including a primary program counter;

at least one primary instruction bus that presents said application program instructions to said device core;

at least one secondary instruction bus that presents said data exchange instructions to said device core;

an instruction bus selection circuit that controls to which of said instruction buses said device core will respond;

at least one Joint Test Advisory Group (JTAG), Institute of Electrical and Electronics Engineers (IEEE) 1149.1 compliant data exchange external interface adapted to collectively:

accept said data exchange instructions from an external device and present said data exchange instructions to said secondary instruction bus; and accept data and status information regarding data exchange accept data and status information regarding data exchange from elements of said microcomputing device other than said data exchange external interface and provide said data and status information regarding data exchange to an external device;

a means for preserving and restoring contents of said primary program counter without the use of a core stack of said microcomputing device; and a JTAG controller port, said JTAG controller port combined onto the same substrate with said microcomputing device in a manner that said JTAG controller port is functional and operative with said microcomputing device, wherein said JTAG controller port is under the control of said microcomputing device; and wherein said JTAG scan engines are arranged so there is at least one master scan engine and at least one slave scan engine, said slave scan engine being responsive to data exchange instructions presented by said master scan engine; and a host computer, said host computer connected to said array processor system and said array processor system being responsive to data exchange instructions initiated by said host computer.

\* \* \* \* \*